US009800196B2

(12) United States Patent
Mori et al.

(10) Patent No.: US 9,800,196 B2
(45) Date of Patent: Oct. 24, 2017

(54) CONTROL APPARATUS FOR AC ROTARY MACHINE

(71) Applicant: Mitsubishi Electric Corporation, Tokyo (JP)

(72) Inventors: Tatsuya Mori, Tokyo (JP); Isao Kezobo, Tokyo (JP); Yoshihiko Kimpara, Tokyo (JP); Masaya Sakai, Tokyo (JP); Akira Furukawa, Tokyo (JP); Yu Kawano, Tokyo (JP); Rei Araki, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/122,290

(22) PCT Filed: Apr. 23, 2014

(86) PCT No.: PCT/JP2014/061413
§ 371 (c)(1),
(2) Date: Aug. 29, 2016

(87) PCT Pub. No.: WO2015/162718
PCT Pub. Date: Oct. 29, 2015

(65) Prior Publication Data
US 2016/0373050 A1    Dec. 22, 2016

(51) Int. Cl.
*H02P 1/04*    (2006.01)
*H02P 29/024*    (2016.01)
(Continued)

(52) U.S. Cl.
CPC ......... *H02P 29/024* (2013.01); *H02H 7/0838* (2013.01); *H02P 25/22* (2013.01); *H02P 27/08* (2013.01)

(58) Field of Classification Search
CPC ........ H02P 27/06; H02P 29/024; H02P 21/14; H02P 29/021; H02P 6/12
(Continued)

(56) References Cited

U.S. PATENT DOCUMENTS

2010/0060222 A1\* 3/2010 Kezobo .................. G01R 31/42
318/490
2011/0204839 A1\* 8/2011 Mukai .................. B62D 5/0487
318/724

(Continued)

FOREIGN PATENT DOCUMENTS

| JP | 2013-162680 A | 8/2013 |
| JP | 2013-176215 A | 9/2013 |
| JP | 2013-247754 A | 12/2013 |

OTHER PUBLICATIONS

International Search Report for PCT/JP2014/061413 dated Jul. 15, 2014.

*Primary Examiner* — Bentsu Ro
*Assistant Examiner* — Thai Dinh
(74) *Attorney, Agent, or Firm* — Sughrue Mion, PLLC; Richard C. Turner

(57) ABSTRACT

A control apparatus for an AC rotary machine includes voltage application units 3, 4 for applying voltages respectively to two sets of three-phase windings of AC rotary machine 1, control unit 5 that controls the voltage application units 3, 4, and fault detection units 6, 7 that output fault detection signals to control unit 5 varying in accordance with the ground short fault and the power short fault. When detecting, control unit 5 outputs a voltage command to faulty voltage application unit 3, 4 to set voltages of respective phases of the three-phase windings at a negative electrode side potential V− of DC power supply 2, and when detecting a power short fault, control unit 5 outputs a voltage command to set the voltages of the respective phases of the
(Continued)

three-phase windings at a positive electrode side potential V+ of DC power supply 2.

9 Claims, 19 Drawing Sheets

(51) Int. Cl.
*H02P 27/08* (2006.01)
*H02P 25/22* (2006.01)
*H02H 7/08* (2006.01)

(58) Field of Classification Search
USPC .... 318/400.01, 400.21, 400.22, 400.26, 491,
318/434, 478, 490; 180/400, 65.1, 65.31,
180/65.8
See application file for complete search history.

(56) References Cited

U.S. PATENT DOCUMENTS

| 2013/0200827 A1* | 8/2013 | Kezobo | H02P 29/0241 |
| | | | 318/400.21 |
| 2013/0299271 A1* | 11/2013 | Endo | B62D 5/046 |
| | | | 180/446 |
| 2013/0314013 A1 | 11/2013 | Ajima et al. | |
| 2014/0132278 A1* | 5/2014 | Tang | G01R 31/025 |
| | | | 324/509 |

* cited by examiner

FIG. 12

| CONDITION OF SWITCH | V(1) | Qup1 | Qun1 | Qvp1 | Qvn1 | Qwp1 | Qwn1 | Sup1 | Sun1 | Svp1 | Svn1 | Swp1 | Swn1 | Idc1 |
|---|---|---|---|---|---|---|---|---|---|---|---|---|---|---|
| NORMAL | V0 | 0 | 1 | 0 | 1 | 0 | 1 | OFF | ON | OFF | ON | OFF | ON | 0 |
| NORMAL | V1 | 1 | 0 | 0 | 1 | 0 | 1 | ON | OFF | OFF | ON | OFF | ON | Iu1 |
| NORMAL | V2 | 1 | 0 | 1 | 0 | 0 | 1 | ON | OFF | ON | OFF | OFF | ON | -Iw1 |
| NORMAL | V3 | 0 | 1 | 1 | 0 | 0 | 1 | OFF | ON | ON | OFF | OFF | ON | Iv1 |
| NORMAL | V4 | 0 | 1 | 1 | 0 | 1 | 0 | OFF | ON | ON | OFF | ON | OFF | -Iu1 |
| NORMAL | V5 | 0 | 1 | 0 | 1 | 1 | 0 | OFF | ON | OFF | ON | ON | OFF | Iw1 |
| NORMAL | V6 | 1 | 0 | 0 | 1 | 1 | 0 | ON | OFF | OFF | ON | ON | OFF | -Iv1 |
| NORMAL | V7 | 1 | 0 | 1 | 0 | 1 | 0 | ON | OFF | ON | OFF | ON | OFF | 0 |

FIG. 13

| CONDITION OF SWITCH | V(2) | Qup2 | Qun2 | Qvp1 | Qvn2 | Qwp2 | Qwn2 | Sup2 | Sun2 | Svp2 | Svn2 | Swp2 | Swn2 | Idc2 |
|---|---|---|---|---|---|---|---|---|---|---|---|---|---|---|
| NORMAL | V0 | 0 | 1 | 0 | 1 | 0 | 1 | OFF | ON | OFF | ON | OFF | ON | 0 |
| NORMAL | V1 | 1 | 0 | 0 | 1 | 0 | 1 | ON | OFF | OFF | ON | OFF | ON | Iu2 |
| NORMAL | V2 | 1 | 0 | 1 | 0 | 0 | 1 | ON | OFF | ON | OFF | OFF | ON | -Iw2 |
| NORMAL | V3 | 0 | 1 | 1 | 0 | 0 | 1 | OFF | ON | ON | OFF | OFF | ON | Iv2 |
| NORMAL | V4 | 0 | 1 | 1 | 0 | 1 | 0 | OFF | ON | ON | OFF | ON | OFF | -Iu2 |
| NORMAL | V5 | 0 | 1 | 0 | 1 | 1 | 0 | OFF | ON | OFF | ON | ON | OFF | Iw2 |
| NORMAL | V6 | 1 | 0 | 0 | 1 | 1 | 0 | ON | OFF | OFF | ON | ON | OFF | -Iv2 |
| NORMAL | V7 | 1 | 0 | 1 | 0 | 1 | 0 | ON | OFF | ON | OFF | ON | OFF | 0 |

FIG. 14

| CONDITION OF SWITCH | V(1) | Qup1 | Qun1 | Qvp1 | Qvn1 | Qwp1 | Qwn1 | Sup1 | Sun1 | Svp1 | Svn1 | Swp1 | Swn1 | Idc1 |
|---|---|---|---|---|---|---|---|---|---|---|---|---|---|---|
| NORMAL | V0 | 0 | 1 | 0 | 1 | 0 | 1 | OFF | ON | OFF | ON | OFF | ON | 0 |
| SHORT-CIRCUIT FAULT IN Sup1 | V0 | 0 | 1 | 0 | 1 | 0 | 1 | ON | ON | OFF | ON | OFF | ON | Is1 |
| SHORT-CIRCUIT FAULT IN Svp1 | V0 | 0 | 1 | 0 | 1 | 0 | 1 | OFF | ON | ON | ON | OFF | ON | Is1 |
| SHORT-CIRCUIT FAULT IN Swp1 | V0 | 0 | 1 | 0 | 1 | 0 | 1 | OFF | ON | OFF | ON | ON | ON | Is1 |
| NORMAL | V7 | 1 | 0 | 1 | 0 | 1 | 0 | ON | OFF | ON | OFF | ON | OFF | 0 |
| SHORT-CIRCUIT FAULT IN Sun1 | V7 | 1 | 0 | 1 | 0 | 1 | 0 | ON | ON | ON | OFF | ON | OFF | Is1 |
| SHORT-CIRCUIT FAULT IN Svn1 | V7 | 1 | 0 | 1 | 0 | 1 | 0 | ON | OFF | ON | ON | ON | OFF | Is1 |
| SHORT-CIRCUIT FAULT IN Swn1 | V7 | 1 | 0 | 1 | 0 | 1 | 0 | ON | OFF | ON | OFF | ON | ON | Is1 |

FIG. 15

| CONDITION OF SWITCH | V(2) | Qup2 | Qun2 | Qvp2 | Qvn2 | Qwp2 | Qwn2 | Sup2 | Sun2 | Svp2 | Svn2 | Swp2 | Swn2 | Idc2 |
|---|---|---|---|---|---|---|---|---|---|---|---|---|---|---|
| NORMAL | V0 | 0 | 1 | 0 | 1 | 0 | 1 | OFF | ON | OFF | ON | OFF | ON | 0 |
| SHORT-CIRCUIT FAULT IN Sup2 | V0 | 0 | 1 | 0 | 1 | 0 | 1 | ON | ON | OFF | ON | OFF | ON | Is2 |
| SHORT-CIRCUIT FAULT IN Svp2 | V0 | 0 | 1 | 0 | 1 | 0 | 1 | OFF | ON | ON | ON | OFF | ON | Is2 |
| SHORT-CIRCUIT FAULT IN Swp2 | V0 | 0 | 1 | 0 | 1 | 0 | 1 | OFF | ON | OFF | ON | ON | ON | Is2 |
| NORMAL | V7 | 1 | 0 | 1 | 0 | 1 | 0 | ON | OFF | ON | OFF | ON | OFF | 0 |
| SHORT-CIRCUIT FAULT IN Sun2 | V7 | 1 | 0 | 1 | 0 | 1 | 0 | ON | ON | ON | OFF | ON | OFF | Is2 |
| SHORT-CIRCUIT FAULT IN Svn2 | V7 | 1 | 0 | 1 | 0 | 1 | 0 | ON | OFF | ON | ON | ON | OFF | Is2 |
| SHORT-CIRCUIT FAULT IN Swn2 | V7 | 1 | 0 | 1 | 0 | 1 | 0 | ON | OFF | ON | OFF | ON | ON | Is2 |

CONTROL APPARATUS FOR AC ROTARY MACHINE

CROSS REFERENCE TO RELATED APPLICATIONS

This application is a National Stage of International Application No. PCT/JP2014/061413 filed Apr. 23, 2014, the contents of all of which are incorporated herein by reference in their entirety.

TECHNICAL FIELD

This invention relates to a control apparatus for an AC (AC: alternating current) rotary machine.

BACKGROUND ART

In a conventional example of a control apparatus for an AC rotary machine, when a fault detection unit detects a fault in one of the inverters, the same potential sides of the respective phases of the fault-side inverter are controlled to be set to a state equivalent to that in the fault, while continuing to control a normal-side inverter rather than the fault-side inverter (see PTL 1, for example).

CITATION LIST

Patent Literature

[PTL 1]
Japanese Patent Application Publication No. 2013-176215

SUMMARY OF INVENTION

Technical Problem

In PTL 1, the fault detection unit determines whether the fault occurring in the inverter is on a high potential side or a low potential side, but does not determine whether the fault is a power short fault or a ground short fault. Therefore, when a power short fault is assumed to have occurred in a U phase semiconductor switch on the high potential side of the fault-side inverter, for example, the semiconductor switch remains in an ON condition permanently. When, at this time, V phase and W phase semiconductor switches on the high potential side of the fault-side inverter are controlled to a state equivalent to that in the fault in accordance with the control method of PTL 1, the V phase and W phase semiconductor switches on the high potential side of the fault-side inverter are switched ON. In this case, however, when a V phase or a W phase semiconductor switch on the low potential side is in an ON condition, the high voltage side and low voltage side semiconductor switches of the corresponding phase are switched ON simultaneously, causing a short-circuit, and as a result, a fault occurs in the low voltage side semiconductor switch.

This invention has been designed to solve the problem described above, and an object thereof is to obtain a control apparatus for an AC rotary machine that can determine whether a power short fault or a ground short fault has occurred, output a voltage command for setting voltages applied respectively to a faulty set of three-phase windings at a negative electrode side potential of a DC power supply when a ground short fault is detected, and output a voltage command for setting the voltages applied respectively to the faulty set of three-phase windings at a positive electrode side potential of the DC power supply when a power short fault is detected, thereby suppressing the occurrence of a short-circuit while continuing to control the AC rotary machine using a voltage application unit related to a normal set.

Solution to Problem

This invention is a control apparatus for an AC rotary machine, which controls an AC rotary machine having N sets of three-phase windings, where N is a natural number no smaller than two, the control apparatus including N voltage application units that power-convert a direct current voltage from a DC power supply and apply voltages respectively to the N sets of three-phase windings, a control unit that outputs a voltage command to the N voltage application units, and a fault detection unit that outputs a fault detection signal to the control unit for each set of three-phase windings when a ground short fault or a power short fault occurs in at least one of the N sets of three-phase windings, wherein a value of the fault detection signal output by the fault detection unit when the ground short fault occurs differs from a value thereof when the power short fault occurs, when the ground short fault is determined to have occurred on the basis of the fault detection signal, the control unit outputs a voltage command to the voltage application unit related to the set of three-phase windings in which the fault has occurred in order to set the voltages applied respectively to the set in which the fault has occurred at a negative electrode side potential of the DC power supply, and when the power short fault is determined to have occurred on the basis of the fault detection signal, the control unit outputs a voltage command to the voltage application unit related to the set of three-phase windings in which the fault has occurred in order to set the voltages applied respectively to the set in which the fault has occurred at a positive electrode side potential of the DC power supply.

Advantageous Effects of Invention

In this invention, the fault detection unit is provided to output the fault detection signal, which varies irrespective of the phase of the three-phase windings in which the ground short fault or the power short fault occurs, and therefore, by determining which of the power short fault and the ground short fault has occurred and outputting a different voltage command to the voltage application unit related to the faulty set depending on whether the ground short fault or the power short fault has occurred, control of the AC rotary machine can be continued using the voltage application unit related to the normal set.

BRIEF DESCRIPTION OF DRAWINGS

FIG. 12 is an illustrative view showing a relationship between conditions of semiconductor switches, a first voltage command, first switching signals, and a fault detection signal, according to the third embodiment of this invention.

FIG. 13 is an illustrative view showing a relationship between the conditions of the semiconductor switches, a second voltage command, second switching signals, and the fault detection signal, according to the third embodiment of this invention.

FIG. 14 is an illustrative view showing the relationship between the conditions of the semiconductor switches, the first voltage command, the first switching signals, and the fault detection signal, according to the third embodiment of this invention.

FIG. 15 is an illustrative view showing the relationship between the conditions of the semiconductor switches, the second voltage command, the second switching signals, and the fault detection signal, according to the third embodiment of this invention.

DESCRIPTION OF EMBODIMENTS

First Embodiment

Figure 1:
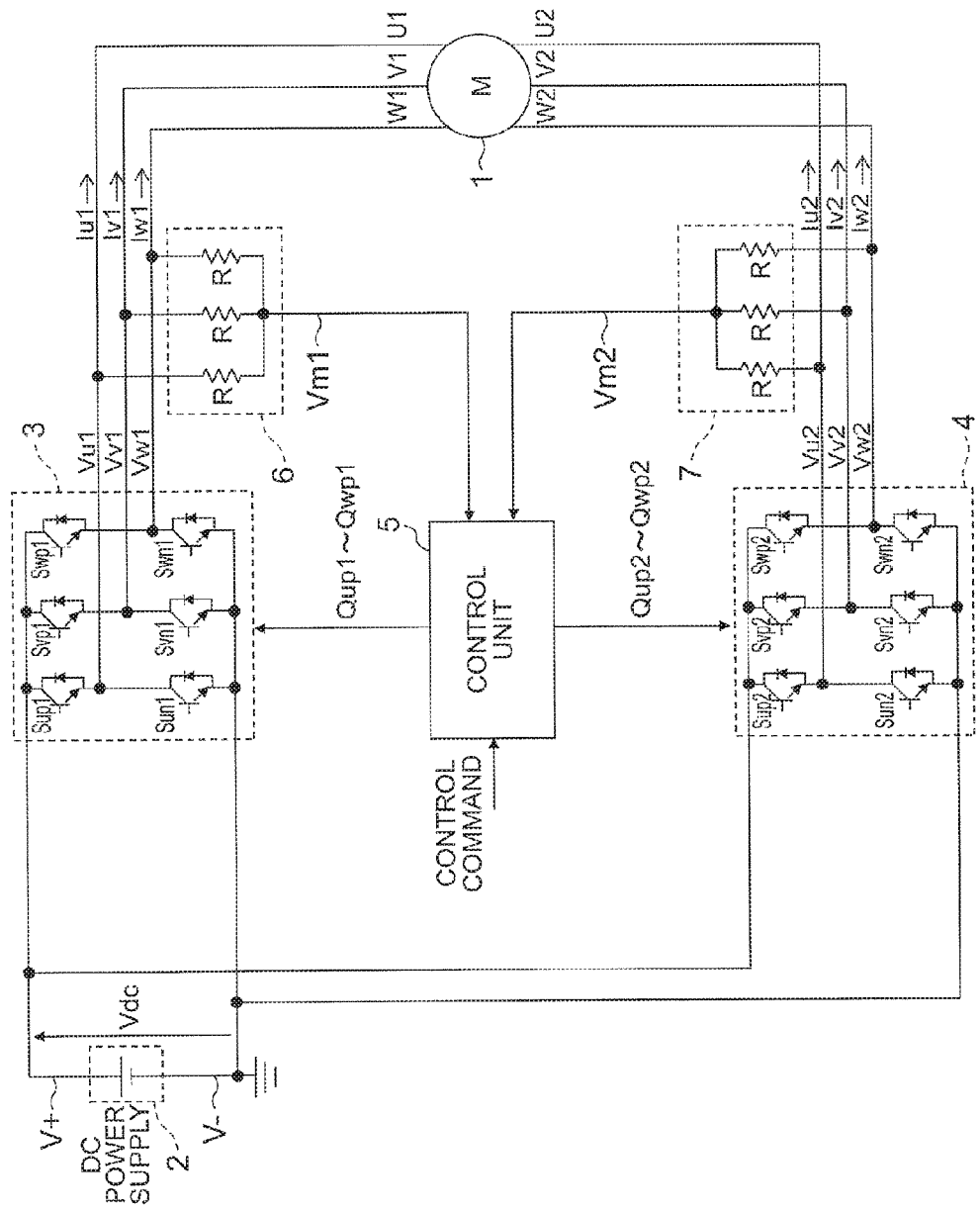
FIG. 1 is a view showing an overall configuration of a control apparatus for an AC rotary machine according to a first embodiment of this invention.

FIG. 1 is a view showing an overall configuration of a control apparatus for an AC rotary machine according to a first embodiment of this invention.

In FIG. 1, an AC rotary machine 1 includes two sets of three-phase windings (first three-phase windings U1, V1, W1 and second three-phase windings U2, V2, W2).

A DC power supply 2 supplies power to a control apparatus for the AC rotary machine. The DC power supply 2 applies a voltage V+ to respective positive electrode sides of a first voltage application unit 3 and a second voltage application unit 4, to be described below, and applies a voltage V− to respective negative electrode sides thereof. Further, a potential difference between the voltage V+ and the voltage V− is set as Vdc. Any device that outputs a direct current voltage, such as a battery, a DC-DC converter, a rectifier diode, or a PWM rectifier, for example, may be used as the DC power supply 2. Furthermore, FIG. 1 shows an example in which the DC power supply 2 is provided singly, but this invention is not limited thereto, and instead, one DC power supply 2 may be provided for each of the first voltage application unit 3 and the second voltage application unit 4.

The control apparatus for the AC rotary machine according to the first embodiment is constituted by the first voltage application unit 3 and the second voltage application unit 4, which are connected between the DC power supply 2 and the AC rotary machine 1, a first fault detector 6 connected between the first voltage application unit 3 and the AC rotary machine 1, a second fault detector 7 connected between the second voltage application unit 4 and the AC rotary machine 1, and a control unit 5 connected to the first voltage application unit 3, the second voltage application unit 4, the first fault detector 6, and the second fault detector 7. Note that the first fault detector 6 and the second fault detector 7 together constitute a fault detection unit that outputs a fault detection signal to the control unit 5 for each set of three-phase windings when a ground short fault or a power short fault occurs in at least one of the two sets of three-phase windings.

The first voltage application unit 3 power-converts the direct current voltage from the DC power supply 2, and applies the obtained voltage to each phase of the first three-phase windings U1, V1, W1 of the AC rotary machine 1. The first voltage application unit 3 is constituted by an inverter having a plurality of semiconductor switches Sup1, Svp1, Swp1, Sun1, Svn1, Swn1 provided in accordance with the respective phases U1, V1, W1 of the AC rotary machine 1.

The upper side semiconductor switches Sup1, Svp1, Swp1 are respectively connected in series to the lower side semiconductor switches Sun1, Svn1, Swn1. A U phase winding of the AC rotary machine 1 is connected to a connection point between the upper side semiconductor switch Sup1 and the lower side semiconductor switch Sun1. Further, a V phase winding of the AC rotary machine 1 is connected to a connection point between the upper side semiconductor switch Svp1 and the lower side semiconductor switch Svn1. Further, a W phase winding of the AC rotary machine 1 is connected to a connection point between the upper side semiconductor switch Swp1 and the lower side semiconductor switch Swn1. The first voltage application unit 3 power-converts a direct current voltage Vdc input from the DC power supply 2 by switching the semiconductor switches Sup1 to Swn1 ON and OFF on the basis of first switching signals Qup1 to Qwn1 output from the control unit 5, and applies voltages Vu1, Vv1, Vw1 to the first three-phase windings U1, V1, W1 of the AC rotary machine 1. Each of the semiconductor switches Sup1 to Swn1 is constituted by a semiconductor switch such as an IGBT, a bipolar transistor, or a MOS power transistor, and a diode connected in anti-parallel to the semiconductor switch. The first switching signals Qup1, Qun1, Qvp1, Qvn1, Qwp1, Qwn1 are used respectively by the first voltage application unit 3 to switch the semiconductor switches Sup1, Sun1, Svp1, Svn1, Swp1, Swn1 ON and OFF.

The second voltage application unit 4 power-converts the direct current voltage from the DC power supply 2, and applies the obtained voltage to each phase of the second three-phase windings U2, V2, W2 of the AC rotary machine 1. The second voltage application unit 4 is constituted by an inverter having a plurality of semiconductor switches Sup2, Svp2, Swp2, Sun2, Svn2, Swn2 provided in accordance with the respective phases U2, V2, W2 of the AC rotary machine 1. The upper side semiconductor switches Sup2, Svp2, Swp2 are respectively connected in series to the lower side semiconductor switches Sun2, Svn2, Swn2. The U phase winding of the AC rotary machine 1 is connected to a connection point between the upper side semiconductor switch Sup2 and the lower side semiconductor switch Sun2. Further, the V phase winding of the AC rotary machine 1 is connected to a connection point between the upper side semiconductor switch Svp2 and the lower side semiconductor switch Svn2. Further, the W phase winding of the AC rotary machine 1 is connected to a connection point between the upper side semiconductor switch Swp2 and the lower side semiconductor switch Swn2. The second voltage application unit 4 power-converts the direct current voltage Vdc input from the DC power supply 2 by switching the semiconductor switches Sup2 to Swn2 ON and OFF on the basis of second switching signals Qup2 to Qwn2, and applies voltages to the second three-phase windings U2, V2, W2 of the AC rotary machine 1. Each of the semiconductor switches Sup2 to Swn2 is constituted by a semiconductor switch such as an IGBT, a bipolar transistor, or a MOS power transistor, and a diode connected in anti-parallel to the semiconductor switch. The second switching signals Qup2, Qun2, Qvp2, Qvn2, Qwp2, Qwn2 are used respectively by the second voltage application unit 4 to switch the semiconductor switches Sup2, Sun2, Svp2, Svn2, Swp2, Swn2 ON and OFF.

In the first embodiment, as described above, two voltage application units (the first voltage application unit 3 and the second voltage application unit 4) are provided.

The control unit 5 outputs voltage commands to the first voltage application unit 3 and the second voltage application unit 4. The control unit 5 calculates first voltage commands Vu1_ref, Vv1_ref, Vw1_ref and second voltage commands Vu2_ref, Vv2_ref, Vw2_ref for driving the AC rotary machine 1. Next, the control unit 5 generates the first switching signals Qup1, Qun1, Qvp1, Qvn1, Qwp1, Qwn1 by subjecting the first voltage commands Vu1_ref, Vv1_ref, Vw1_ref to pulse width modulation (PWM), and outputs the generated first switching signals to the first voltage application unit 3. Similarly, the control unit 5 generates the second switching signals Qup2, Qun2, Qvp2, Qvn2, Qwp2, Qwn2 by subjecting the second voltage commands Vu2_ref, Vv2_ref, Vw2_ref to pulse width modulation (PWM), and outputs the generated second switching signals to the second voltage application unit 4. Methods of calculating the first voltage commands Vu1_ref, Vv1_ref, Vw1_ref and the second voltage commands Vu2_ref, Vv2_ref, Vw2_ref will now be described. In one calculation method, for example, a command f relating to a speed (a frequency) of the AC rotary machine 1 is set as a control command input into the control unit 5 shown in FIG. 1, whereupon the voltage commands are calculated by employing V/F control to determine amplitudes of the first voltage commands and the second voltage commands. In a different calculation method, the voltage commands may be calculated by setting a current command applied to the AC rotary machine 1 as the control command and then calculating the voltage commands using the current command and a voltage equation of the AC rotary machine by inserting the current command into the voltage equation. In another calculation method, the voltage commands may be determined by means of feedback control by providing a current detection unit to detect currents Iu1, Iv1, Iw1 flowing through the first three-phase windings and determining the first voltage commands Vu1_ref, Vv1_ref, Vw1_ref on the basis of deviations between the current command and the currents Iu1, Iv1, Iw1 through proportional integral control for reducing the deviations to zero, and by providing a current detection unit to detect currents Iu2, Iv2, Iw2 flowing through the second three-phase windings and calculating the second voltage commands Vu2_ref, Vv2_ref, Vw2_ref on the basis of deviations between the current command and the currents Iu2, Iv2, Iw2 through proportional integral control for reducing the deviations to zero. Hereafter, control and calculations performed in accordance with these calculation methods will be referred to collectively as "normal control" (see step S83 in FIG. 8, step S93 in FIG. 9, step S365 in FIG. 16, and step S375 in FIG. 17).

The fault detector 6 (the fault detection unit) is constituted by three resistors R connected respectively to the first three-phase windings U1, V1, W1. The fault detector 6 calculates a fault detection signal Vm1 on the basis of terminal voltages Vu1, Vv1, Vw1 of the first three-phase windings U1, V1, W1, and outputs the calculated fault detection signal Vm1 to the control unit 5. Values of the fault detection signal Vm1 output from the fault detection unit 6 in a normal condition, when a ground short fault occurs and when a power short fault occurs differ from one another.

The fault detector 7 (the fault detection unit) is constituted by three resistors R connected respectively to the second three-phase windings U2, V2, W2. The fault detector 7 calculates a fault detection signal Vm2 on the basis of terminal voltages Vu2, Vv2, Vw2 of the second three-phase windings U2, V2, W2, and outputs the calculated fault detection signal Vm2 to the control unit 5. A value of the fault detection signal Vm2 output from the fault detection unit 7 when a ground short fault occurs differs from a value thereof when a power short fault occurs.

Figure 2:
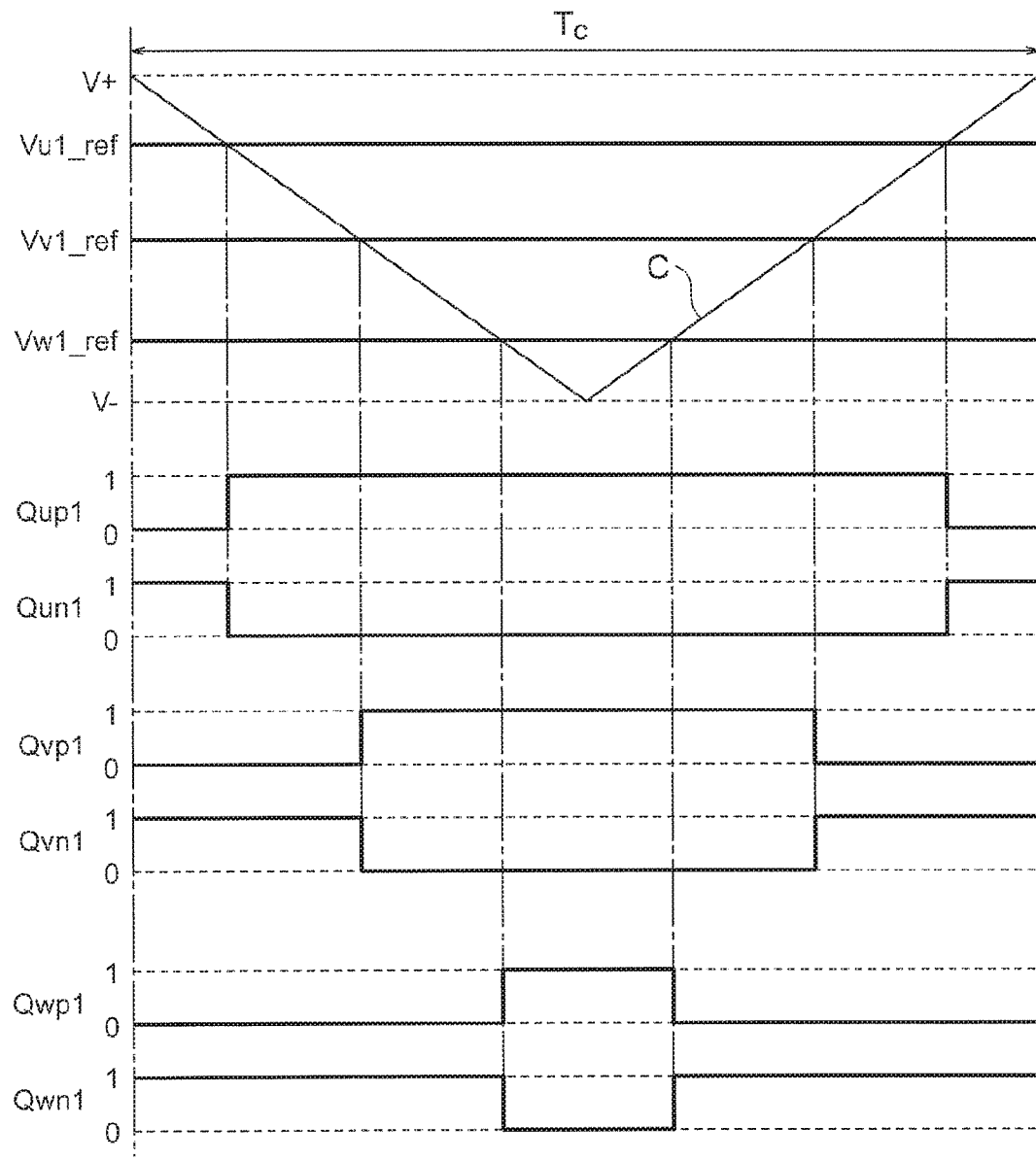
FIG. 2 is an illustrative view showing a relationship between first voltage commands and first switching signals according to the first embodiment of this invention.
Figure 3:
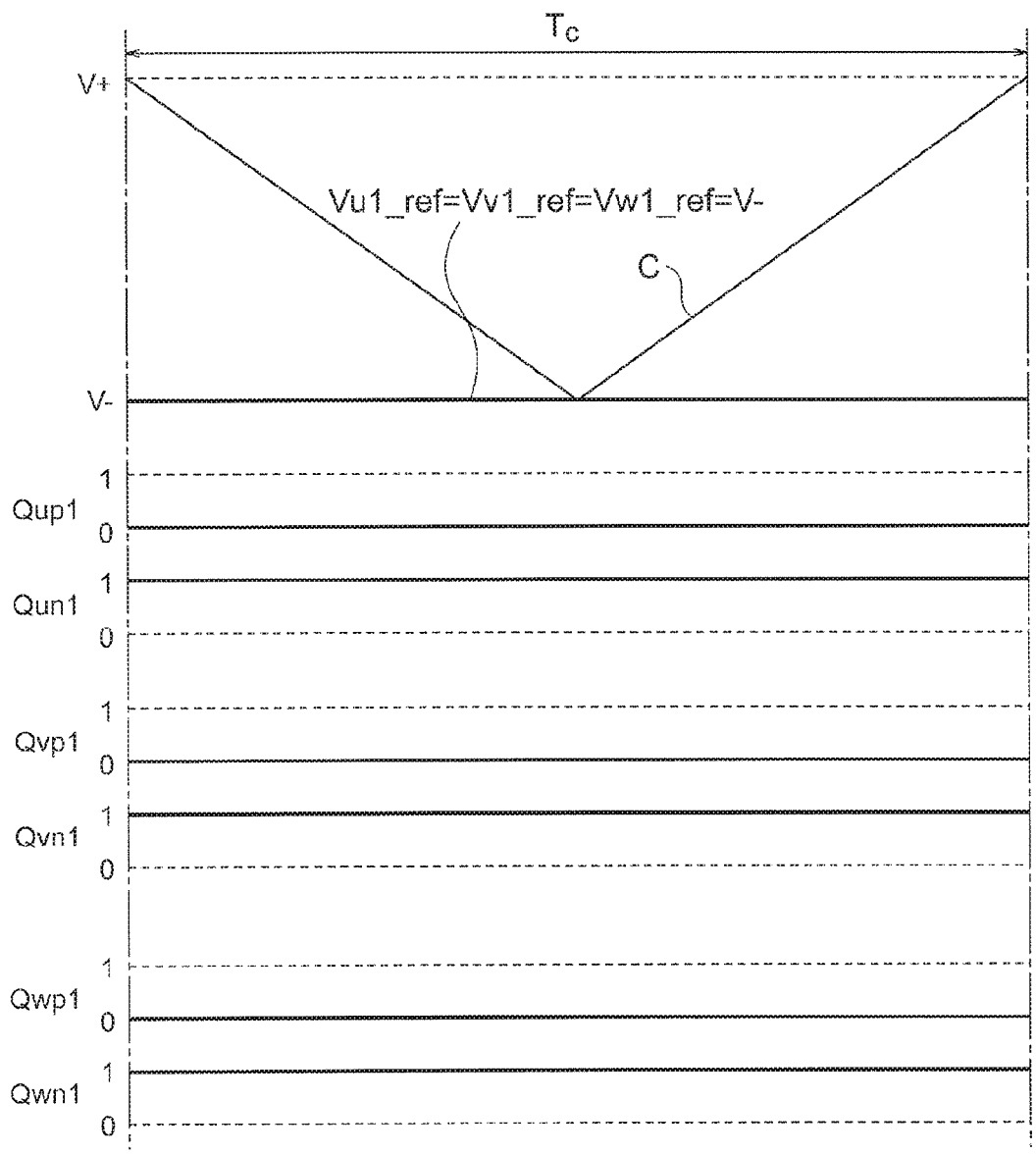
FIG. 3 is an illustrative view showing the relationship between the first voltage commands and the first switching signals according to the first embodiment of this invention.
Figure 4:
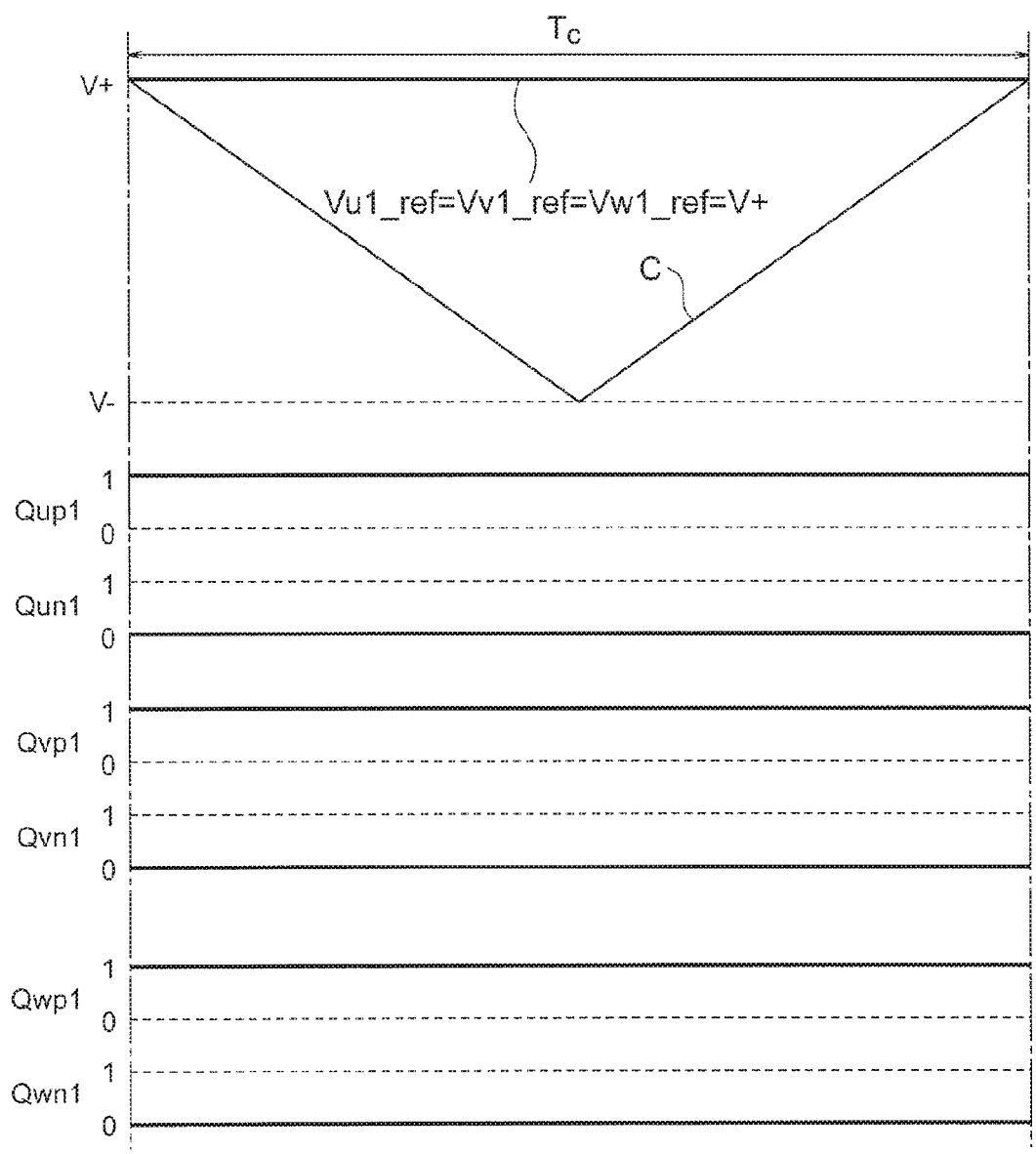
FIG. 4 is an illustrative view showing the relationship between the first voltage commands and the first switching signals according to the first embodiment of this invention.

A relationship between the first voltage commands Vu1_ref, Vv1_ref, Vw1_ref and the first switching signals Qup1, Qun1, Qvp1, Qvn1, Qwp1, Qwn1, generated by the control unit 5, will now be described in detail. FIGS. 2 to 4 are views illustrating relationships between the first voltage commands Vu1_ref, Vv1_ref, Vw1_ref and the first switching signals Qup1, Qun1, Qvp1, Qvn1, Qwp1, Qwn1.

In FIG. 2, C denotes a triangular wave (a PWM carrier wave) having a maximum potential (a crest) of V+ (a positive electrode side potential of the DC power supply 2) and a minimum potential (a valley) of V− (a negative electrode side potential of the DC power supply 2). In FIG. 2, the first voltage commands Vu1_ref, Vv1_ref, Vw1_ref are set such that V+>Vu1_ref>Vv1_ref>Vw1_ref>V−. At this time, the triangular wave C is compared respectively with the first voltage commands Vu1_ref, Vv1_ref, Vw1_ref. When, as a result of the comparison, Vu1_ref is larger than the triangular wave C, Qup1 and Qun1 are set respectively at 1 and 0. When, on the other hand, Vu1_ref is smaller than the triangular wave C, Qup1 and Qun1 are set respectively at 0 and 1. Further, when Vv1_ref is larger than the triangular wave C, Qvp1 and Qvn1 are set respectively at 1 and 0, whereas when Vv1_ref is smaller than the triangular wave C, Qvp1 and Qvn1 are set respectively at 0 and 1. Furthermore, when Vw1_ref is larger than the triangular wave C, Qwp1 and Qwn1 are set respectively at 1 and 0, whereas when Vw1_ref is smaller than the triangular wave C, Qwp1 and Qwn1 are set respectively at 0 and 1. Here, with respect to the first switching signals Qup1, Qun1, Qvp1, Qvn1, Qwp1, Qwn1, "1" means that a command is issued to switch the semiconductor switches corresponding to the signals ON, and "0" means that a command is issued to switch the semiconductor switches corresponding to the signals OFF. Hence, as shown in FIG. 2, the semiconductor switches Sup1 to Swn1 of the first voltage application unit 3 are switched ON and OFF in accordance with the first switching signals Qup1 to Qwn1.

FIG. 3 shows the first switching signals Qup1 to Qwn1 in a case where all of the first voltage commands Vu1_ref, Vv1_ref, Vw1_ref are set at the valley potential V− of the triangular wave C (the negative electrode side potential of the DC power supply 2). In this case, when the first voltage commands Vu1_ref, Vv1_ref, Vw1_ref are compared with the triangular wave C, the triangular wave C is always either larger than or equal to the first voltage commands Vu1_ref, Vv1_ref, Vw1_ref. Accordingly, the first switching signals Qup1, Qvp1, Qwp1 are set permanently at 0, while the first switching signals Qun1, Qvn1, Qwn1 are set permanently at 1. In the first voltage application unit 3, therefore, as shown in FIG. 3, the semiconductor switches Sun1, Svn1, Swn1 are switched permanently ON and the semiconductor switches Sup1, Svp1, Swp1 are switched permanently OFF in accordance with the first switching signals Qup1 to Qwn1.

FIG. 4 shows the first switching signals Qup1 to Qwn1 in a case where all of the first voltage commands Vu1_ref, Vv1_ref, Vw1_ref are set at the crest potential V+ of the triangular wave C (the positive electrode side potential of the DC power supply 2). In this case, when the first voltage commands Vu1_ref, Vv1_ref, Vw1_ref are compared with the triangular wave C, the triangular wave C is always either smaller than or equal to the first voltage commands Vu1_ref, Vv1_ref, Vw1_ref. Accordingly, the first switching signals Qup1, Qvp1, Qwp1 are set permanently at 1, while the first switching signals Qun1, Qvn1, Qwn1 are set permanently at 0. In the first voltage application unit 3, therefore, as shown in FIG. 4, the semiconductor switches Sup1, Svp1, Swp1 are switched permanently ON while the semiconductor switches Sun1, Svn1, Swn1 are switched permanently OFF in accordance with the first switching signals Qup1 to Qwn1.

Figure 5:
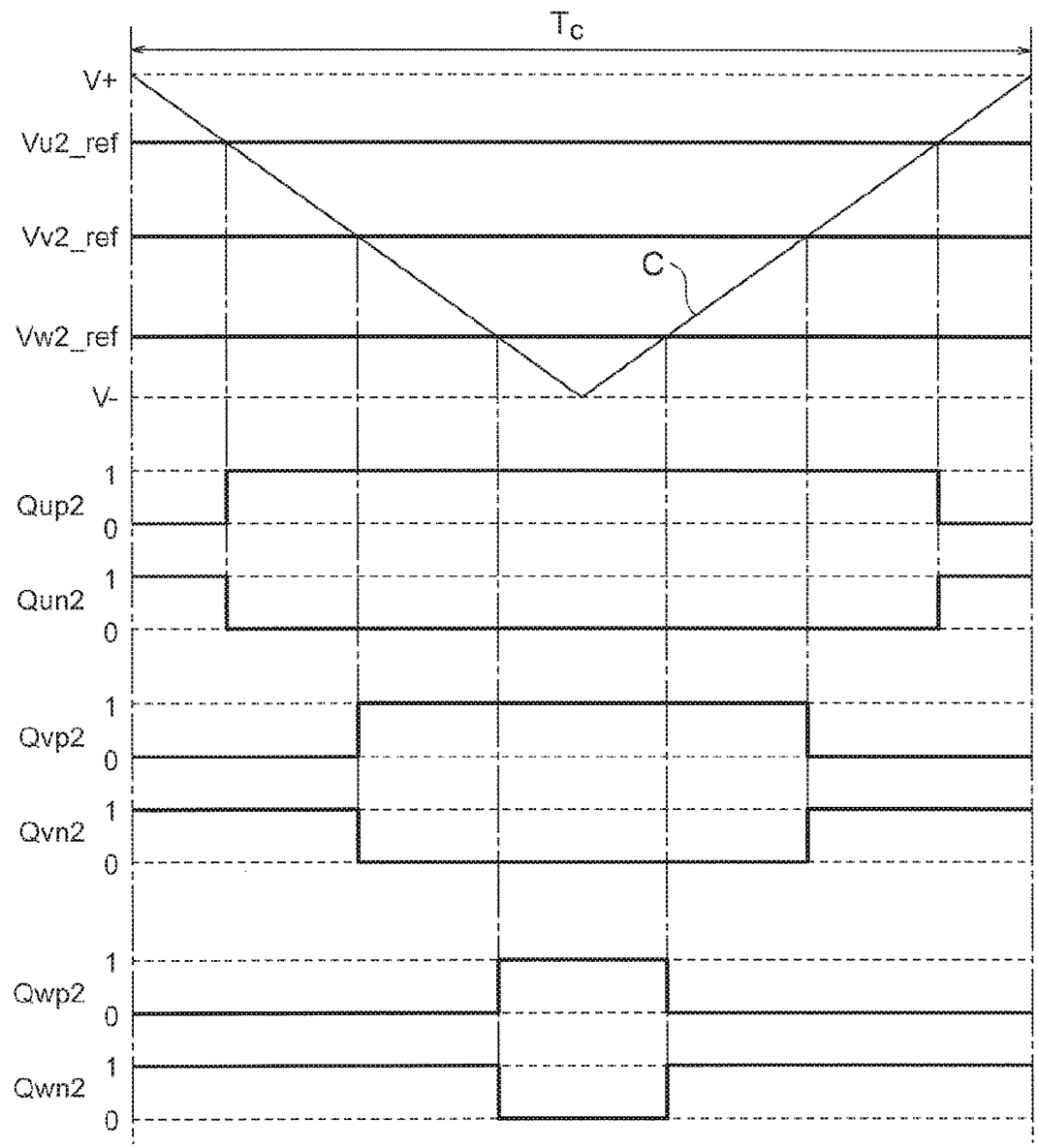
FIG. 5 is an illustrative view showing a relationship between second voltage commands and second switching signals according to the first embodiment of this invention.
Figure 6:
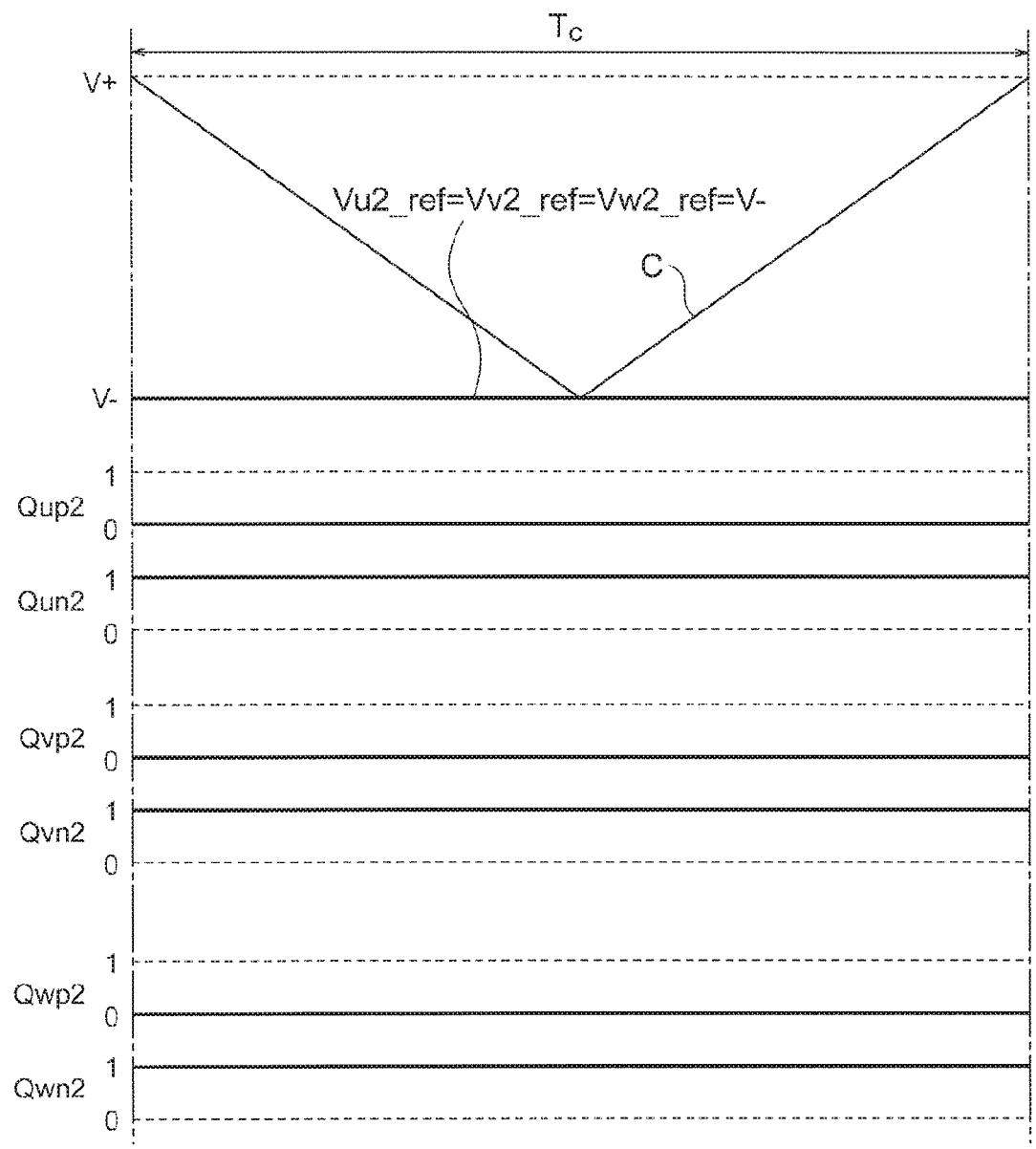
FIG. 6 is an illustrative view showing the relationship between the second voltage commands and the second switching signals according to the first embodiment of this invention.
Figure 7:
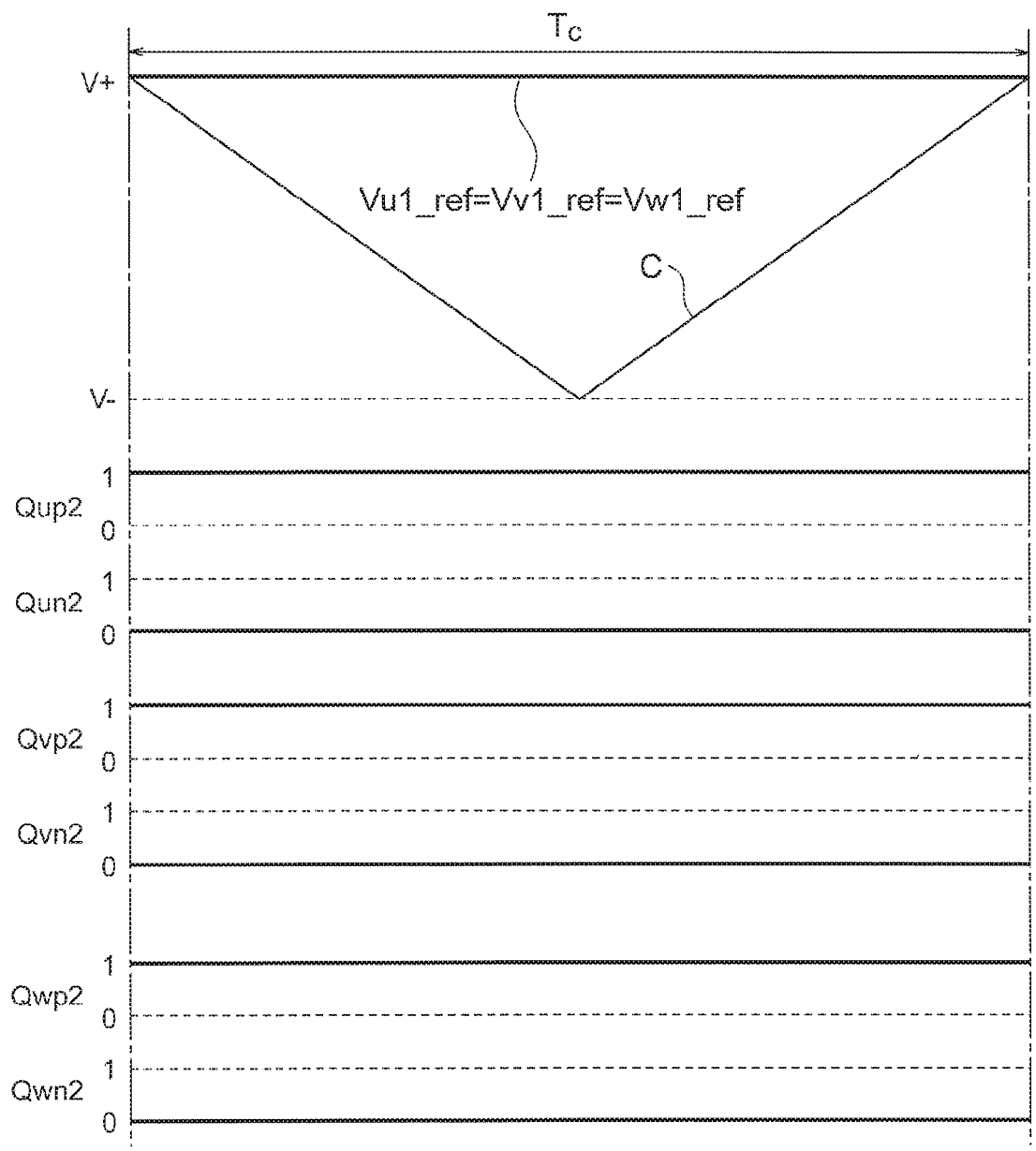
FIG. 7 is an illustrative view showing the relationship between the second voltage commands and the second switching signals according to the first embodiment of this invention.

A relationship between the second voltage commands Vu2_ref, Vv2_ref, Vw2_ref and the second switching signals Qup2, Qun2, Qvp2, Qvn2, Qwp2, Qwn2, generated by the control unit 5, will now be described in detail. FIGS. 5 to 7 are views illustrating relationships between the second voltage commands Vu2_ref, Vv2_ref, Vw2_ref and the second switching signals Qup2, Qun2, Qvp2, Qvn2, Qwp2, Qwn2.

In FIG. 5, C denotes a triangular wave (a PWM carrier wave) having a maximum potential (a crest) of V+ (the positive electrode side potential of the DC power supply 2) and a minimum potential (a valley) of V− (the negative electrode side potential of the DC power supply 2). In FIG. 5, the second voltage commands Vu2_ref, Vv2_ref, Vw2_ref are set such that V+>Vu2_ref>Vv2_ref>Vw2_ref>V−. At this time, the triangular wave C is compared respectively with the second voltage commands Vu2_ref, Vv2_ref, Vw2_ref. When, as a result of the comparison, Vu2_ref is larger than the triangular wave C, Qup2 and Qun2 are set respectively at 1 and 0. When, on the other hand, Vu2_ref is smaller than the triangular wave C, Qup2 and Qun2 are set respectively at 0 and 1. Further, when Vv2_ref is larger than the triangular wave C, Qvp2 and Qvn2 are set respectively at 1 and 0, whereas when Vv2_ref is smaller than the triangular wave C, Qvp2 and Qvn2 are set respectively at 0 and 1. Furthermore, when Vw2_ref is larger than the triangular wave C, Qwp2 and Qwn2 are set respectively at 1 and 0, whereas when Vw2_ref is smaller than the triangular wave C, Qwp2 and Qwn2 are set respectively at 0 and 1. Here, with respect to the second switching signals Qup2, Qun2, Qvp2, Qvn2, Qwp2, Qwn2, "1" means that a command is issued to switch the semiconductor switches corresponding to the signals ON, and "0" means that a command is issued to switch the semiconductor switches corresponding to the signals OFF. Hence, as shown in FIG. 5, the semiconductor switches Sup2 to Swn2 of the second voltage application unit 4 are switched ON and OFF in accordance with the second switching signals Qup2 to Qwn2.

FIG. 6 shows the second switching signals Qup2 to Qwn2 in a case where the second voltage commands Vu2_ref, Vv2_ref, Vw2_ref are set at the valley potential V− of the triangular wave C (the negative electrode side potential of the DC power supply 2). In this case, when the second voltage commands Vu2_ref, Vv2_ref, Vw2_ref are compared with the triangular wave C, the triangular wave C is always either larger than or equal to the second voltage commands Vu2_ref, Vv2_ref, Vw2_ref. Accordingly, the second switching signals Qup2, Qvp2, Qwp2 are set permanently at 0, while the second switching signals Qun2, Qvn2, Qwn2 are set permanently at 1. In the second voltage application unit 4, therefore, as shown in FIG. 6, the semiconductor switches Sun2, Svn2, Swn2 are switched permanently ON and the semiconductor switches Sup2, Svp2, Swp2 are switched permanently OFF in accordance with the second switching signals Qup2 to Qwn2.

FIG. 7 shows the second switching signals Qup2 to Qwn2 in a case where the second voltage commands Vu2_ref, Vv2_ref, Vw2_ref are set at the crest potential V+ of the triangular wave C (the positive electrode side potential of the DC power supply 2). In this case, when the second voltage commands Vu2_ref, Vv2_ref, Vw2_ref are compared with the triangular wave C, the triangular wave C is either smaller than or equal to the second voltage commands Vu2_ref, Vv2_ref, Vw2_ref. Accordingly, the second switching signals Qup2, Qvp2, Qwp2 are set permanently at 1, while the second switching signals Qun2, Qvn2, Qwn2 are set permanently at 0. In the second voltage application unit 4, therefore, as shown in FIG. 7, the semiconductor switches Sup2, Svp2, Swp2 are switched permanently ON and the semiconductor switches Sun2, Svn2, Swn2 are switched permanently OFF in accordance with the second switching signals Qup2 to Qwn2.

On the basis of the above description, voltages corresponding to the first voltage commands Vu1_ref, Vv1_ref, Vw1_ref are output respectively as the terminal voltages Vu1, Vv1, Vw1 of the first three-phase windings U1, V1, W1, while voltages corresponding to the second voltage commands Vu2_ref, Vv2_ref, Vw2_ref are output respectively as the terminal voltages Vu2, Vv2, Vw2 of the second three-phase windings U2, V2, W2.

Next, an operation of the fault detector 6 will be described. As shown in FIG. 1, in the fault detector 6, the three resistors R are provided in accordance with the respective phases of the first three-phase windings U1, V1, W1. The voltage Vm1 obtained from the respective windings of the first three-phase windings U1, V1, W1 via the resistors R is given by Equation (1), shown below, and is determined by adding together the terminal voltages Vu1, Vv1, Vw1 of the first three-phase windings U1, V1, W1.

$$Vm1 = (Vu1+Vv1+Vw1)/3 \quad (1)$$

Accordingly, a value Vm1 obtained by adding together the terminal voltages Vu1, Vv1, Vw1 of the first three-phase windings U1, V1, W1 is input into the control unit 5.

A voltage applied to an AC rotary machine having three-phase windings is typically a three-phase alternating current voltage in which a phase difference corresponding to an electrical angle of $2\pi/3$ exists between the respective phases, and therefore the first voltage commands Vu1_ref, Vv1_ref, Vw1_ref are expressed respectively by Equations (2) to (4), shown below.

$$Vu1\_ref = Vamp1 \cdot \cos(\theta) + Vdc/2 \quad (2)$$

$$Vv1\_ref = Vamp1 \cdot \cos(\theta - \pi/3) + Vdc/2 \quad (3)$$

$$Vw1\_ref = Vamp1 \cdot \cos(\theta + 2\pi/3) + Vdc/2 \quad (4)$$

Here, Vamp1 denotes an amplitude of the first voltage commands Vu1_ref, Vv1_ref, Vw1_ref. As shown in FIG. 1, V− is set as a reference (0 V) potential, and therefore the first voltage commands Vu1_ref, Vv1_ref, Vw1_ref are offset by a value of Vdc/2, which corresponds to half the output voltage of the DC power supply 2.

In Equations (2) to (4), when the semiconductor switches Sup1 to Swn1 of the first voltage application unit 3 are operating normally, the first voltage commands are substantially equal to the terminal voltages of the first three-phase windings such that Vu1≈Vu1_ref, Vv1≈Vv1_ref, and Vw1≈Vw1_ref, and therefore Equations (5) to (7), shown below, are established from Equations (2) to (4).

$$Vu1 = Vamp1 \cdot \cos(\theta) + Vdc/2 \quad (5)$$

$$Vv1 = Vamp1 \cdot \cos(\theta - \pi/3) + Vdc/2 \quad (6)$$

$$Vw1 = Vamp1 \cdot \cos(\theta + 2\pi/3) + Vdc/2 \quad (7)$$

When Equations (5) to (7) are inserted into Equation (1), Equation (8) is obtained.

$$Vm1 = Vdc/2 \quad (8)$$

Hence, when the first voltage application unit 3 is operating normally, Vm1 takes a value corresponding to half the direct current voltage Vdc.

A case in which a ground short fault occurs in one of the first three-phase windings U1, V1, W1 will now be considered. Here, a "ground short fault" is a fault in which the terminal voltage of at least one phase of the three-phase windings becomes fixed at the negative electrode side potential V− of the DC power supply 2. In terms of the first three-phase windings U1, V1, W1, a ground short fault occurs when at least one of the semiconductor switches Sun1, Svn1, Swn1 of the first voltage application unit 3 remains permanently in an ON condition, regardless of the conditions of the corresponding first switching signals Qun1, Qvn1, Qwn1 (this condition will be referred to hereafter as a short-circuit fault).

A case in which the semiconductor switch Sun1 remains permanently ON regardless of the condition of the corresponding switching signal Qun1 will be described below as an example. When, at this time, the first voltage commands are given by Equations (2) to (4), the terminal voltages Vu1 to Vw1 of the first three-phase windings U1, V1, W1 are given by Equations (9) to (11).

$$Vu1 = 0 \quad (9)$$

$$Vv1 = Vamp1 \cdot \cos(\theta - \pi/3) + Vdc/2 \quad (10)$$

$$Vw1 = Vamp1 \cdot \cos(\theta + 2\pi/3) + Vdc/2 \quad (11)$$

Hence, the terminal voltage Vu1 is fixed at 0 V, and when Vu1, Vv1, Vw1 are controlled to sine wave voltages, Vamp≤Vdc/2 is established such that Vu1 in Equation (9) becomes smaller than Vu1 in Equation (5). Therefore, when Vm1 is determined by inserting Equations (9) to (11) into Equation (1), Vm1 takes a smaller value than Vm1 shown in Equation (8). Further, Vm1 takes a smaller value than Vm1 shown in Equation (8) not only when Vu1 is fixed at 0 V, but also when the other terminal voltages Vv1, Vw1 is fixed at 0 V. Hence, Vm1 varies irrespective of the phase of the first three-phase windings U1, V1, W1 in which the ground short fault occurs, with the result that Vm1 takes a smaller value than Vm1 shown in Equation (8), i.e. when a fault has not occurred.

In accordance with the above description, when a ground short fault occurs in the first three-phase windings U1, V1, W1, at least one phase becomes fixed at the negative electrode side potential V− of the DC power supply 2. As a result, Vm1 takes a smaller value when a ground short fault occurs than in a normal condition.

Next, a case in which a power short fault occurs in the first three-phase windings U1, V1, W1 will be considered. Here, a "power short fault" is a fault in which the terminal voltage of at least one phase of the three-phase windings becomes fixed at the positive electrode side potential V+ of the DC power supply 2. In terms of the first three-phase windings U1, V1, W1, a power short fault occurs when at least one of the semiconductor switches Sup1, Svp1, Swp1 of the first voltage application unit 3 remains permanently in an ON condition, regardless of the conditions of the corresponding first switching signals Qup1, Qvp1, Qwp1 (this condition will be referred to hereafter as a short-circuit fault).

A case in which a short-circuit fault occurs the semiconductor switch Sup1 will be described as an example. When, at this time, the first voltage commands are given by Equations (2) to (4), the terminal voltages Vu1 to Vw1 of the first three-phase windings are given by Equations (12) to (14).

$$Vu1 = Vdc \quad (12)$$

$$Vv1 = Vamp1 \cdot \cos(\theta - \pi/3) + Vdc/2 \quad (13)$$

$$Vw1 = Vamp1 \cdot \cos(\theta + 2\pi/3) + Vdc/2 \quad (14)$$

Hence, the terminal voltage Vu1 is fixed at Vdc [V], and when Vu1, Vv1, Vw1 are controlled to sine wave voltages, Vamp Vdc/2 is established such that Vu1 in Equation (12) becomes larger than Vu1 in Equation (5). Therefore, when Vm1 is determined by inserting Equations (12) to (14) into Equation (1), Vm1 takes a larger value than Vm1 shown in Equation (8). Further, Vm1 takes a larger value than Vm1 shown in Equation (8) not only when Vu1 is fixed at Vdc [V], but also when the other terminal voltages Vv1, Vw1 is fixed at Vdc [V]. Hence, Vm1 varies irrespective of the phase of the first three-phase windings U1, V1, W1 in which the power short fault occurs, with the result that Vm1 takes a larger value than Vm1 shown in Equation (8), i.e. when a fault has not occurred.

In accordance with the above description, when a power short fault occurs in the first three-phase windings U1, V1, W1, at least one phase becomes fixed at the positive electrode side potential V+ of the DC power supply 2. Therefore, Vm1 takes a larger value when a power short fault occurs than in a normal condition.

Hence, in the fault detector 6, the value of Vm1, which is determined in relation to the first three-phase windings U1, V1, W1 by adding together the terminal voltages (Vu1, Vv1, Vw1) of the respective phases of the first three-phase windings U1, V1, W1, increases when a power short fault occurs and decreases when a ground short fault occurs relative to the value thereof when the first three-phase windings U1, V1, W1 are normal.

Likewise in the fault detector 7, the value of Vm2 (=(Vu2+Vv2+Vw2)/3), which is determined in relation to the second three-phase windings U2, V2, W2 by adding together the terminal voltages (Vu2, Vv2, Vw2) of the respective phases of the second three-phase windings U2, V2, W2, increases when a power short fault occurs and decreases when a ground short fault occurs relative to the value thereof when the second three-phase windings U2, V2, W2 are normal.

In the first embodiment, therefore, these facts are used to detect a power short fault and a ground short fault.

In the first embodiment, Vm1 and Vm2 are used as fault detection signals, making use of the fact that the respective values of Vm1 and Vm2 increase when a power short fault occurs and decrease when a ground short fault occurs relative to the values thereof in a normal condition in which no fault has occurred. In other words, a power short fault is determined to have occurred when the fault detection signals Vm1 and Vm2 respectively reach or exceed preset power short fault determination thresholds Vte1 and Vte2. Meanwhile, a ground short fault is determined to have occurred when the fault detection signals Vm1 and Vm2 respectively fall to or below preset ground short fault determination thresholds Vch1 and Vch2.

Here, the power short fault determination threshold Vte1 may be set to be larger than Vm1 in a normal condition and smaller than Vm1 when a power short fault occurs, while the ground short fault determination threshold Vch1 may be set to be smaller than Vm1 in a normal condition and larger than Vm1 when a ground short fault occurs. Similarly, the power short fault determination threshold Vte2 may be set to be larger than Vm2 in a normal condition and smaller than Vm2 when a power short fault occurs, while the ground short fault determination threshold Vch2 may be set to be smaller than Vm2 in a normal condition and larger than Vm2 when a ground short fault occurs. Note that the values of Vm1 and Vm2 when a power short fault occurs and the values of Vm1 and Vm2 when a ground short fault occurs may be determined in advance by experiment and the like.

Figure 8:
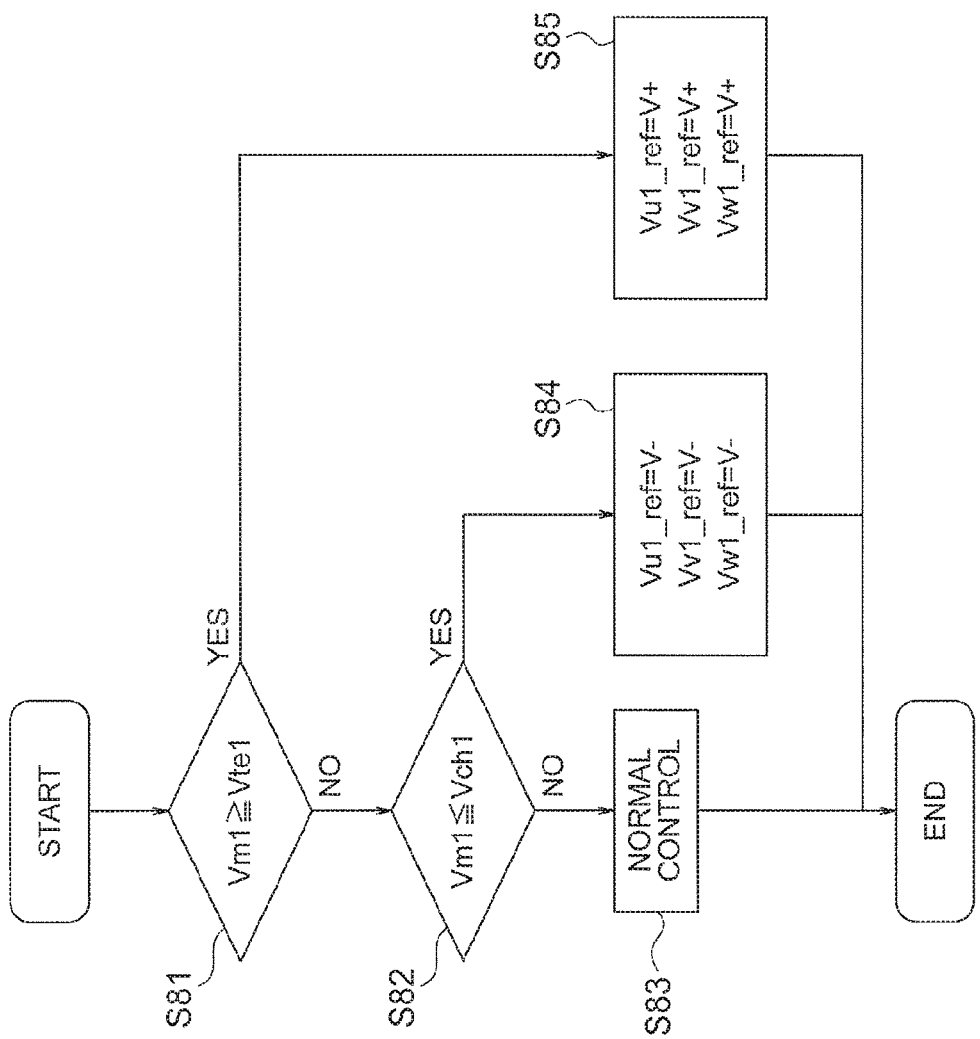
FIG. 8 is a flowchart showing an operation of a control unit provided in the control apparatus for the AC rotary machine according to the first embodiment of this invention.

FIG. 8 is a view showing an operation of the control unit 5 according to the first embodiment. As shown in FIG. 8, in step S81, the control unit 5 compares Vm1 with the power short determination threshold Vte1. When Vm1 is equal to or larger than the power short determination threshold Vte1 in step S81, a power short fault is determined to have occurred ("YES" is selected), and the routine advances to step S85. In step S85, the first voltage commands Vu1_ref, Vv1_ref, Vw1_ref are set at V+(the positive electrode side potential of the DC power supply 2). When Vm1 is smaller than the power short determination threshold Vte1 in step S81, on the other hand, a power short fault is determined not to have occurred ("NO" is selected), and the routine advances to step S82. In step S82, Vm1 is compared with the ground short determination threshold Vch1. When Vm1 is equal to or smaller than the ground short determination threshold Vch1 in step S82, a ground short fault is determined to have occurred ("YES" is selected), and the routine advances to step S84. In step S84, the first voltage commands Vu1_ref, Vv1_ref, Vw1_ref are set at V− (the negative electrode side potential of the DC power supply 2). When Vm1 is larger than the ground short determination threshold Vch1 in step S82, on the other hand, it is determined that neither a power short fault nor a ground short fault has occurred ("NO" is selected), and the routine advances to step S83. In step S83, the normal control described above is executed. Note that the order of step S81 and step S82 in FIG. 8 may be reversed.

As described above, when a power short fault is determined to have occurred in FIG. 8, the first voltage commands Vu1_ref, Vv1_ref, Vw1_ref are set at V+(the positive electrode side potential of the DC power supply 2) in step S85. Accordingly, as shown in FIG. 4, the control unit 5 sets the first switching signals Qup1, Qvp1, Qwp1 permanently at 1 in order to output a command to the first voltage application unit 3 to switch the semiconductor switches Sup1, Svp1, Swp1 permanently ON. The respective voltages of the first three-phase windings U1, V1, W1 are thus controlled to the positive electrode side potential V+ of the DC power supply 2, and as a result, the respective voltages can be set at identical potentials to the potential of the phase in which the power short fault has occurred. Similarly, when a ground short fault is determined to have occurred in FIG. 8, the first voltage commands Vu1_ref, Vv1_ref, Vw1_ref are set at V− (the negative electrode side potential of the DC power supply 2) in step S84. Accordingly, as shown in FIG. 3, the control unit 5 sets the first switching signals Qun1, Qvn1, Qwn1 permanently at 1 in order to output a command to the first voltage application unit 3 to switch the semiconductor switches Sun1, Svn1, Swn1 permanently ON. The respective voltages of the first three-phase windings U1, V1, W1 are thus controlled to the negative electrode side potential V− of the DC power supply 2, and as a result, the respective voltages can be set at identical potentials to the potential of the phase in which the ground short fault has occurred.

Figure 9:
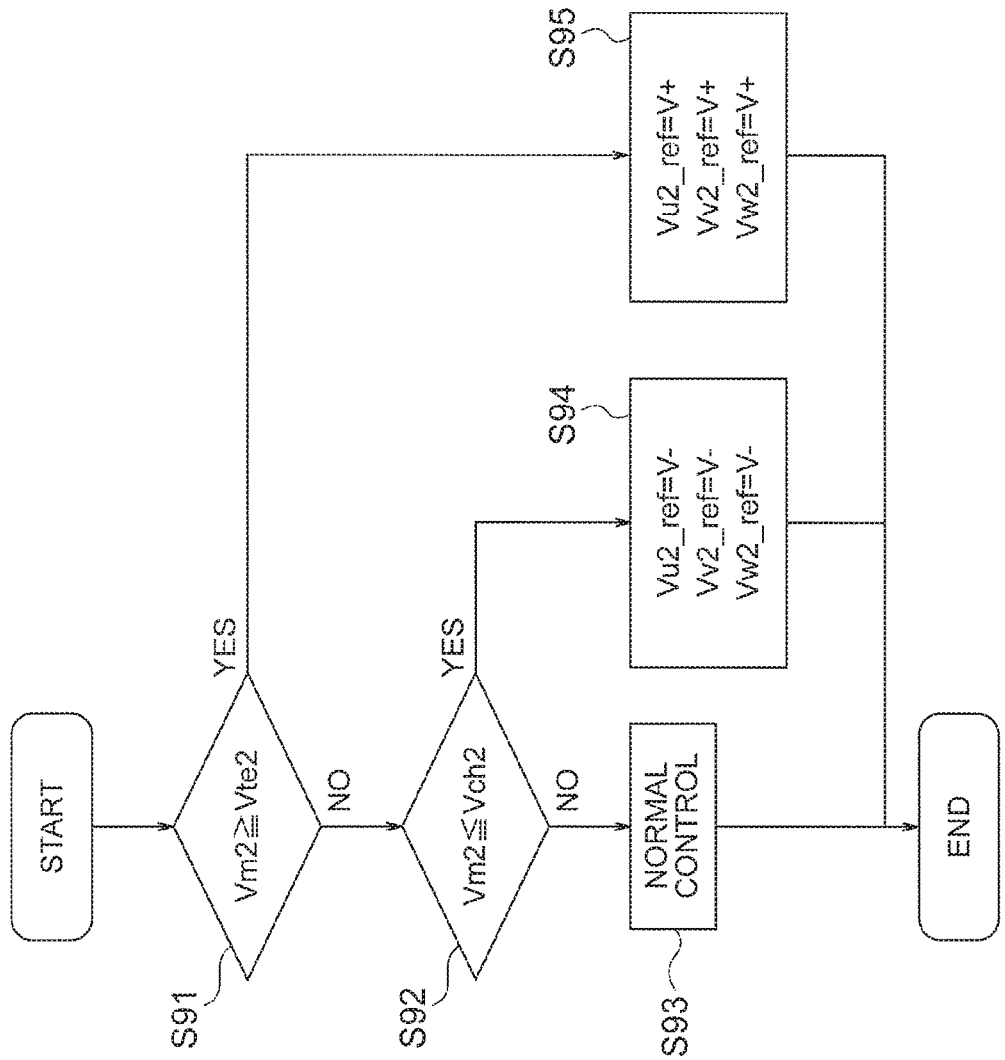
FIG. 9 is a flowchart showing an operation of the control unit provided in the control apparatus for the AC rotary machine according to the first embodiment of this invention.

FIG. 9, similarly to FIG. 8, is a view showing an operation of the control unit 5 according to the first embodiment. As shown in FIG. 9, in step S91, the control unit 5 compares Vm2 with the power short determination threshold Vte2. When Vm2 is equal to or larger than the power short determination threshold Vte2 in step S91, a power short fault is determined to have occurred ("YES" is selected), and the routine advances to step S95. In step S95, the second voltage commands Vu2_ref, Vv2_ref, Vw2_ref are set at V+(the positive electrode side potential of the DC power supply 2). When Vm2 is smaller than the power short determination threshold Vte2 in step S91, on the other hand, a power short fault is determined not to have occurred ("NO" is selected), and the routine advances to step S92. In step S92, Vm2 is compared with the ground short determination threshold Vch2. When Vm2 is equal to or smaller than the ground short determination threshold Vch2 in step S92, a ground short fault is determined to have occurred ("YES" is selected), and the routine advances to step S94. In step S94, the second voltage commands Vu2_ref, Vv2_ref, Vw2_ref are set at V− (the negative electrode side potential of the DC power supply 2). When Vm2 is larger than the ground short determination threshold Vch2 in step S92, on the other hand, it is determined that neither a power short fault nor a ground short fault has occurred ("NO" is selected), and the routine advances to step S93. In step S93, the normal control described above is executed. Note that the order of step S91 and step S92 in FIG. 9 may be reversed.

As described above, when a power short fault is determined to have occurred in FIG. 9, the second voltage commands Vu2_ref, Vv2_ref, Vw2_ref are set at V+(the positive electrode side potential of the DC power supply 2), and therefore, as shown in FIG. 7, the control unit 5 sets the second switching signals Qup2, Qvp2, Qwp2 permanently at 1 in order to output a command to the second voltage application unit 4 to switch the semiconductor switches Sup2, Svp2, Swp2 permanently ON. The respective voltages of the second three-phase windings U2, V2, W2 are thus controlled to the positive electrode side potential of the DC power supply 2, and as a result, the respective voltages can be set at identical potentials to the potential of the phase in which the power short fault has occurred. Similarly, when a ground short fault is determined to have occurred, the second voltage commands Vu2_ref, Vv2_ref, Vw2_ref are set at V− (the negative electrode side potential of the DC power supply 2), and therefore, as shown in FIG. 6, the control unit 5 sets the second switching signals Qun2, Qvn2, Qwn2 permanently at 1 in order to output a command to the second voltage application unit 4 to switch the semiconductor switches Sun2, Svn2, Swn2 permanently ON. The respective voltages of the second three-phase windings are thus controlled to the negative electrode side potential of the DC power supply 2, and as a result, the respective voltages can be set at identical potentials to the potential of the phase in which the ground short fault has occurred.

PTL 1, described above, does not mention setting the voltages at identical potentials on the basis of a power short fault and a ground short fault, and therefore, when the semiconductor switch Sup1 of the first voltage application unit 3, for example, is switched ON regardless of the condition of the first switching signal Qup1 such that a power short fault occurs, and the first switching signals Qup1, Qvp1, Qwp1 shown in FIG. 3 are set permanently at 1 in order to set the respective voltages of the first three-phase windings at identical potentials, the semiconductor switches Sup1, Svp1, Swp1 are switched ON, with the result that a short circuit fault occurs due to simultaneous switching ON of the semiconductor switches Svp1 and Svn1 and a short circuit fault occurs due to simultaneous switching ON of the semiconductor switches Swp1 and Swn1, leading to faults in the semiconductor switches Svn1 and Swn1. In the first embodiment of this invention, however, by outputting Vm1 and Vm2, which are based on added values of the terminal voltages of the respective phases of the three-phase windings and vary irrespective of the phase of the three-phase windings in which the ground short fault or power short fault occurs, the control unit 5 can output voltage commands to the voltage application unit 3 or 4 related to the faulty set, in order to set the respective voltages to the negative electrode side potential of the DC power supply 2 when a ground short fault is detected, and to set the respective voltages to the positive electrode side potential of the DC power supply 2 when a power short fault is detected, and as a result, the respective voltages of the faulty set can be controlled to identical potentials without causing a short-circuit fault. Further, in the first embodiment, a complicated configuration is not required to detect the terminal voltages of the respective phases when detecting a power short or a ground short, and a power short or a ground short can be detected in one set of three-phase windings using a single fault detection signal (the added value Vm1 of the terminal voltages of the first three-phase windings with respect to the first three-phase windings, and the added value Vm2 of the terminal voltages of the second three-phase windings with respect to the second three-phase windings). As a result, fault detection can be realized with a simple configuration.

As shown in FIG. 1, in the first embodiment described above, the control apparatus for the AC rotary machine includes the two voltage application units 3, 4 for power-converting the direct current voltage from the DC power supply 2 and applying voltages respectively to the two sets of three-phase windings, the control unit 5 that outputs voltage commands to the two voltage application units 3, 4, and the fault detection units 6, 7 that output a fault detection signal to the control unit 5 for each set of three-phase windings when a ground short fault or a power short fault occurs in at least one of the two sets of three-phase windings. The fault detection units 6, 7 output different values as the fault detection signals Vm1, Vm2 depending on whether a ground short fault or a power short fault has occurred. After determining on the basis of the fault detection signals Vm1, Vm2 that a ground short fault has occurred, the control unit 5 outputs voltage commands to the voltage application unit 3 or 4 related to the set of three-phase windings in which the fault has occurred in order to set the respective voltages applied to the three-phase windings of the faulty set to the negative electrode side potential V− of the DC power supply 2. After determining on the basis of the fault detection signals Vm1, Vm2 that a power short fault has occurred, the control unit 5 outputs voltage commands in order to set the respective voltages applied to the three-phase windings of the faulty set to the positive electrode side potential V+ of the DC power supply 2. In the first embodiment, therefore, by providing the fault detection units 6, 7 for outputting, to the control unit 5, fault detection signals that vary irrespective of the phase of the three-phase windings in which the ground short fault or power short fault occurs, the control unit 5 can output voltage commands to the voltage application unit 3 or 4 related to the faulty set on the basis of the fault detection signals to set the respective voltages at the negative electrode side potential V− of the DC power supply 2 when a ground short fault is detected and to set the respective voltages at the positive electrode side potential V+ of the DC power supply 2 when a power short fault is detected, and as a result, control of the AC rotary machine 1 can be continued using the voltage application unit 3 or 4 related to the normal set rather than the faulty set.

Furthermore, in the first embodiment, the fault detection units 6, 7 generate the fault detection signals by respectively adding together the terminal voltages of the three-phase windings, and therefore a fault can be detected in one set of three-phase windings using a single fault detection signal. As a result, a ground short fault and a power short fault can be detected with a simple configuration.

Moreover, in the first embodiment, the control unit 5 compares the value of the fault detection signal with the preset ground short determination threshold, and when the value of the fault detection signal is equal to or smaller than the ground short determination threshold, determines that a ground short fault has occurred. Hence, the determination as to whether or not a ground short fault has occurred can be made reliably by means of simple calculation processing.

Furthermore, in the first embodiment, the control unit 5 compares the value of the fault detection signal with the preset power short determination threshold, and when the value of the fault detection signal is equal to or larger than the power short determination threshold, determines that a power short fault has occurred. Hence, the determination as to whether or not a power short fault has occurred can be made reliably by means of simple calculation processing.

Second Embodiment

Figure 10:
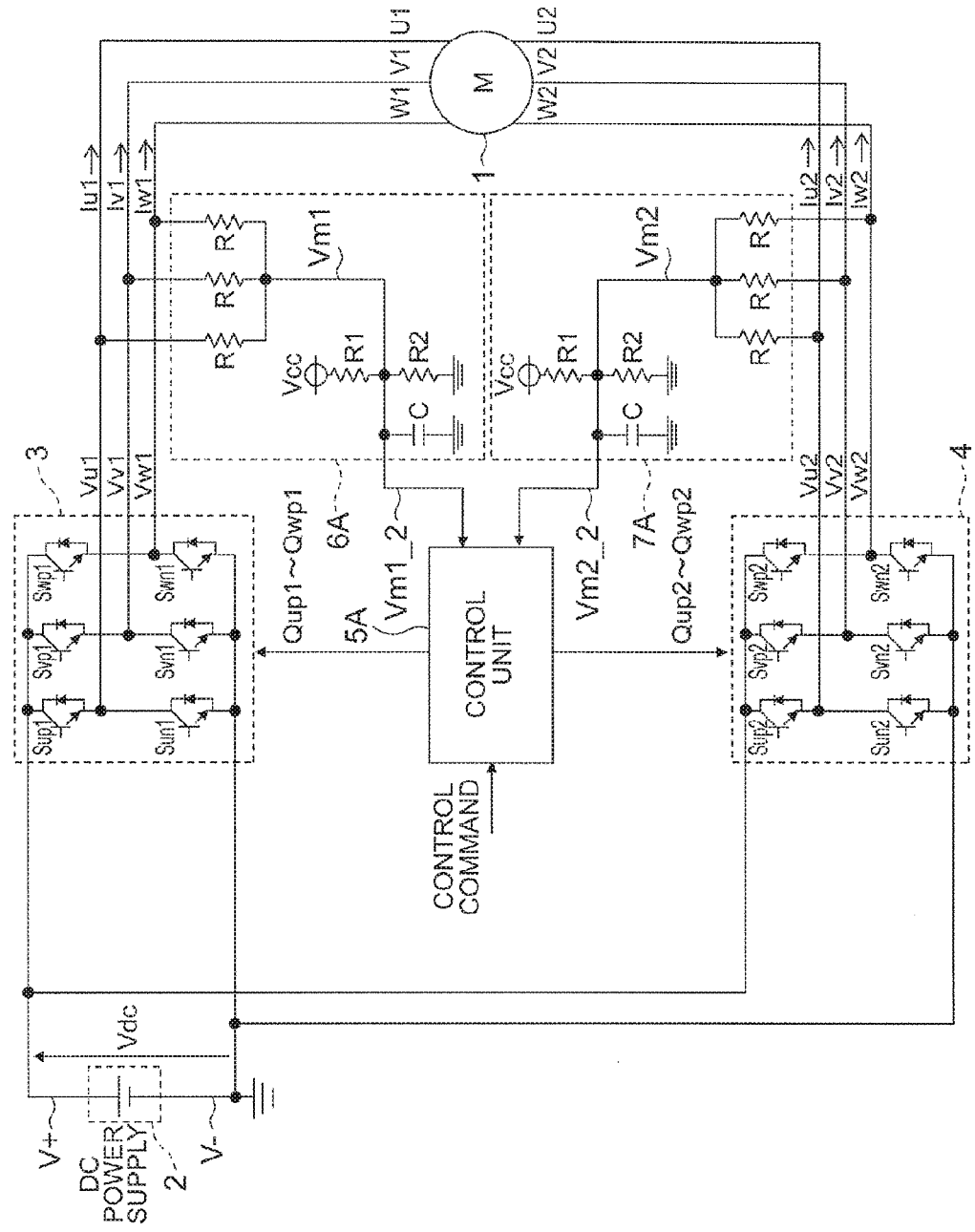
FIG. 10 is a view showing an overall configuration of a control apparatus for an AC rotary machine according to a second embodiment of this invention.

FIG. 10 is a view showing an overall configuration of a control apparatus for an AC rotary machine according to a second embodiment of this invention. The second embodiment differs from the first embodiment in including fault detectors 6A, 7A and a control unit 5A, instead of fault detectors 6, 7 and a control unit 5. All other configurations are identical to the first embodiment, and therefore identical reference numerals have been allocated to identical components and description thereof has been omitted.

The fault detectors 6A, 7A are formed by adding low pass filters (R1, R2, C) respectively to the fault detectors 6, 7. The low pass filters are each constituted by two resistors R1, R2 connected in series and a capacitor C connected in parallel to the resistors R1, R2. Hence, the fault detectors 6A, 7A according to the second embodiment are each constituted by the three resistors R provided in accordance with the three phases of the AC rotary machine 1, and the low pass filter (R1, R2, C). The low pass filter has a low pass characteristic according to which a cutoff frequency is lower than a PWM carrier wave frequency fc (=1/Tc).

The fault detector 6A outputs the voltage Vm1 obtained from the respective windings of the first three-phase windings U1, V1, W1 via the resistors R to the control unit 5A via the low pass filter (R1, R2, C) as a fault detection signal Vm1_2. Here, as illustrated by Equation (1) in the first embodiment, the value of Vm1 is obtained by adding together the terminal voltages Vu1, Vv1, Vw1 of the first three-phase windings U1, V1, W1.

Similarly, the fault detector 7A outputs the voltage Vm2 obtained from the respective windings of the second three-phase windings U2, V2, W2 via the resistors R to the control unit 5A via the low pass filter (R1, R2, C) as a fault detection signal Vm2_2. Here, as described in the first embodiment, the value of Vm2 is obtained by adding together the terminal voltages Vu2, Vv2, Vw2 of the second three-phase windings U2, V2, W2 (in other words, Vm2=(Vu2+Vv2+Vw2)/3).

Here, the fault detection signals Vm1_2, Vm2_2 are represented respectively by Equations (15) and (16), shown below.

$$Vm1\_2=R'Vcc+R''(Vu1+Vv1+Vw1)/(1+\tau s) \qquad (15)$$

$$Vm2\_2=R'Vcc+R''(Vu2+Vv2+Vw2)/(1+\tau s) \qquad (16)$$

Note that here, Vcc is a preset constant voltage, while R', R'', and τ are given by the equations shown below.

$$R'=\{R1//(R/3)\}/\{R2+\{R2+\{R2//(R/3)\}\}\}$$

$$R''=\{R1//R2//(R/2)\}/\{R+\{R+\{R1//R2//(R/2)\}\}\}$$

$$\tau=C\cdot R\cdot R''$$

Here, τ may be set such that when a PWM carrier wave (triangular wave) period Tc is 50 μs, τ=approximately 1 ms.

In accordance with Equations (2) to (4), illustrated above, the added value of the terminal voltages of the three-phase windings U1, V1, W1 of the AC rotary machine 1 is Vu1+Vv1+Vw1=3Vdc/2, and when the PWM carrier wave (triangular wave) component is removed, Vm1_2=R' Vcc+3R'' Vdc/2 is obtained. Similarly, the added value of the terminal voltages of the three-phase windings U2, V2, W2 of the AC rotary machine 1 is Vu2+Vv2+Vw2=3Vdc/2, and when the PWM carrier wave (triangular wave) component is removed, Vm2_2=R' Vcc+3R'' Vdc/2 is obtained. Hence, when the semiconductor switches Sup1 to Swn1 of the first voltage application unit 3 and the semiconductor switches Sup2 to Swn2 of the second voltage application unit 4 are operating normally, Vm1 and Vm2 are both set at "Vdc/2" in the first embodiment, whereas in the second embodiment, Vm1_2 and Vm2_2 are both set at "R' Vcc+3R'' Vdc/2".

In the first embodiment, the control unit 5 sets reference values of the detection signals Vm1, Vm2 used when no fault has occurred at "Vdc/2", sets the power short determination threshold and the ground short determination threshold on the basis thereof, and then detects a power short fault and a ground short fault. Similarly, in the second embodiment, the control unit 5A sets the reference values of the detection signals Vm1_2, Vm2_2 used when no fault has occurred at "R' Vcc+3R'' Vdc/2", sets the power short determination threshold and the ground short determination threshold on the basis thereof, and then detects a power short fault and a ground short fault.

The control unit 5A differs from the control unit 5 only in the method of setting the power short determination threshold and the ground short determination threshold, and is otherwise identical to the control unit 5.

Effects brought about by the fault detectors 6A, 7A according to the second embodiment will now be described. The reference values of the outputs Vm1, Vm2 of the fault detectors 6, 7 according to the first embodiment are set at "Vdc/2" regardless of values of the resistors R. Hence, when the output Vdc of the DC power supply 2 is 300 V, for example, the reference values of Vm1 and Vm2 are both 150 V. The control unit 5 must therefore input 150 V, but when the control unit 5 is realized by a microcomputer or the like, a voltage detection range of the microcomputer may be limited to "no less than 0 V and no more than 5 V" or the like, for example, and in this case, 150 V cannot be input. On the other hand, the reference values of the outputs Vm1_2, Vm2_2 of the fault detectors 6A, 7A according to the second embodiment are set at "R' Vcc+3R'' Vdc/2", and therefore, even when Vdc is 300 V, for example, the values of Vm1_2 and Vm2_2 can be adjusted by setting the values of the voltage Vcc and the resistors R1 and R2 appropriately, and can even be adjusted to the aforesaid range of "no less than 0 V and no more than 5 V". As a result, the second embodiment can be applied to a case in which the control unit 5A is realized by a microcomputer having a limited voltage detection range.

Further, in the fault detectors 6A, 7A according to the second embodiment, the triangular wave (PWM carrier wave) component included in the terminal voltages Vu1, Vv1, Vw1, Vu2, Vv2, and Vw2 is removed by R1, R2, C, and therefore this component is likewise removed from the fault detection signals Vm1_2, Vm2_2. As a result, erroneous detection of a power short fault or a ground short fault by the control unit 5A can be prevented.

Moreover, in the second embodiment, similarly to the first embodiment, a complicated configuration is not required to detect the terminal voltages of the respective phases when detecting a power short or a ground short, and a fault can be detected in one set of three-phase windings using a single fault detection signal (the added value Vm1_2 of the terminal voltages of the first three-phase windings with respect to the first three-phase windings, and the added value Vm2_2 of the terminal voltages of the second three-phase windings with respect to the second three-phase windings). As a result, fault detection can be realized with a simple configuration.

Third Embodiment

Figure 11:
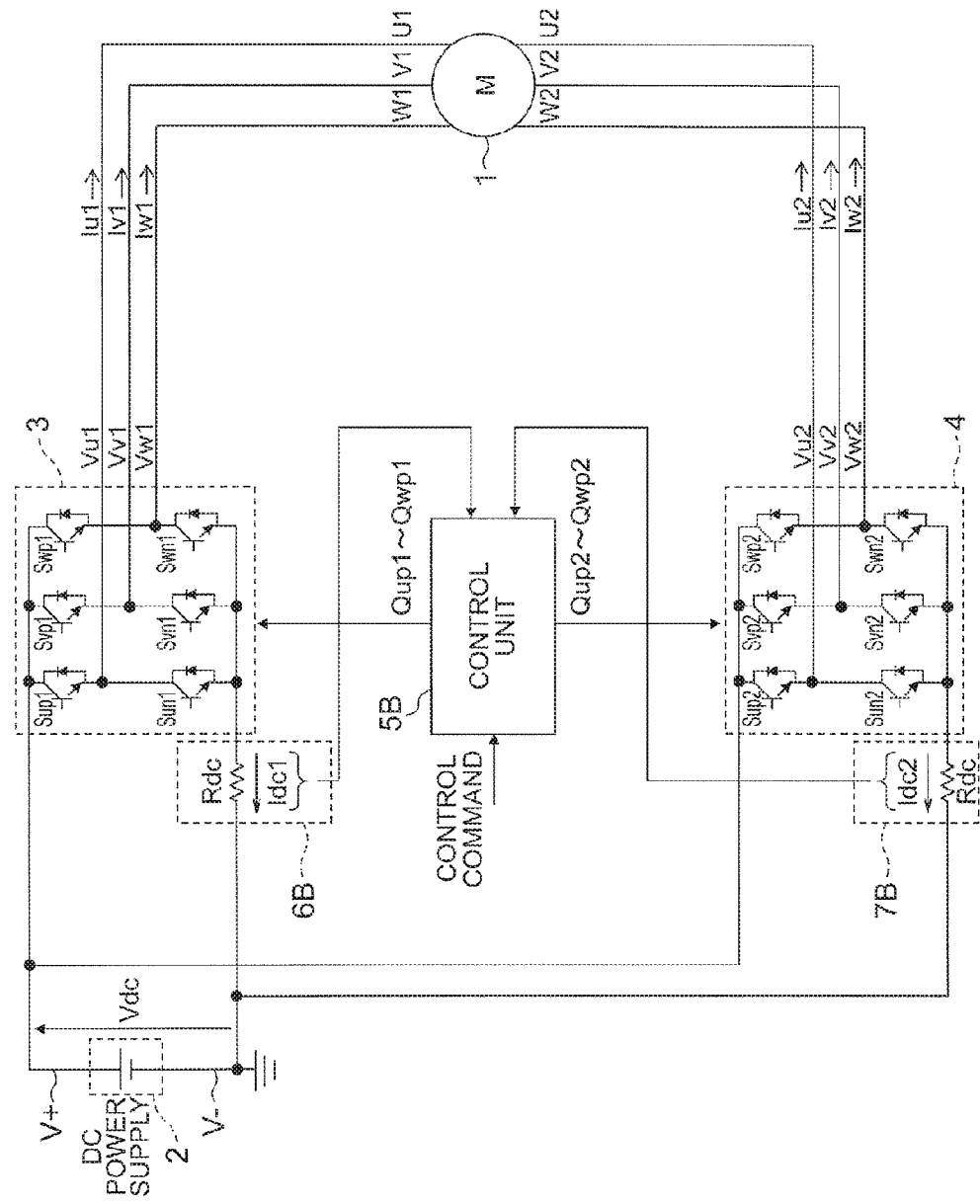
FIG. 11 is a view showing an overall configuration of a control apparatus for an AC rotary machine according to a third embodiment of this invention.

FIG. 11 is a view showing an overall configuration of a control apparatus for an AC rotary machine according to a third embodiment of this invention. The third embodiment differs from the first and second embodiments in including fault detectors 6B, 7B and a control unit 5B, instead of fault detectors 6, 7 and a control unit 5. All other configurations are identical to the first and second embodiments, and therefore identical reference numerals have been allocated to identical components and description thereof has been omitted.

The fault detector 6B is connected between the first voltage application unit 3 and the DC power supply 2. The fault detector 6B is constituted by a resistor Rdc connected in series with a DC bus of the first voltage application unit 3. The fault detector 6B includes a bus current detector that detects a first bus current Idc1 flowing through the DC bus of the first voltage application unit 3 by detecting respective end voltages of the resistor Rdc, and outputs the detected first bus current Idc1 to the control unit 5B.

The fault detector 7B is connected between the second voltage application unit 4 and the DC power supply 2. The fault detector 7B is constituted by a resistor Rdc connected in series with a DC bus of the second voltage application unit 4. The fault detector 7B includes a bus current detector that detects a second bus current Idc2 flowing through the DC bus of the second voltage application unit 4 by detecting respective end voltages of the resistor Rdc, and outputs the detected second bus current Idc2 to the control unit 5B.

FIG. 12 is a view illustrating on a table relationships between the condition (normal/faulty) of the semiconductor switches Sup1 to Swn1 of the first voltage application unit 3, a first voltage vector V(1), the switching signals Qup1 to Qwn1 corresponding to the first voltage vector V(1), the ON/OFF condition of the semiconductor switches Sup1 to Swn1, and phase currents (Iu1, Iv1, Iw1) that flow through the first three-phase windings and are equal to the first bus current Idc1. In a case where all of the semiconductor switches Sup1 to Swn1 are normal, as shown in FIG. 12, when the switching signals Qup1 to Qwn1 corresponding to the first voltage vector V(1) are at "1", the corresponding semiconductor switches are switched ON, and when the switching signals Qup1 to Qwn1 corresponding to the first voltage vector V(1) are at "0", the corresponding semiconductor switches are switched OFF. Further, when the first voltage vector V(1) is at either V0 or V7, the first bus current Idc1 falls to 0, whereas when the first voltage vector V(1) is at a value other than V0 or V7, the first bus current Idc1 becomes equal to either one of the three phase currents (Iu1, Iv1, Iw1) flowing through the first three-phase windings or either one of sign-inverted values (−Iu1, −Iv1, −Iw1) of the three phase currents (Iu1, Iv1, Iw1).

Here, as illustrated below, the first voltage vector V(1) is a vector having the first voltage commands Vu1_ref, Vv1_ref, Vw1_ref as elements.

$$V(1)=(Vu1\_ref, Vv1\_ref, Vw1\_ref)$$

Furthermore, "the first voltage vector V(1) is at V0" corresponds to the first voltage vector V(1) when the control unit 5B outputs the first voltage commands Vu1_ref, Vv1_ref, Vw1_ref in order to set the respective voltages Vu1, Vv1, Vw1 of the first three-phase windings U1, V1, W1 to the negative electrode side potential V− of the DC power supply 2.

Similarly, "the first voltage vector V(1) is at V7" corresponds to the first voltage vector V(1) when the control unit 5B outputs the first voltage commands Vu1_ref, Vv1_ref, Vw1_ref in order to set the respective voltages Vu1, Vv1, Vw1 of the first three-phase windings U1, V1, W1 to the positive electrode side potential V+ of the DC power supply 2.

FIG. 13 is a view illustrating on a table relationships between the condition (normal/faulty) of the semiconductor switches Sup2 to Swn2 of the second voltage application unit 4, a second voltage vector V(2), the switching signals Qup2 to Qwn2 corresponding to the second voltage vector V(2), the ON/OFF condition of the semiconductor switches Sup2 to Swn2, and phase currents (Iu2, Iv2, Iw2) that flow through the second three-phase windings and are equal to the second bus current Idc2. In a case where all of the semiconductor switches Sup2 to Swn2 are normal, as shown in FIG. 13, when the switching signals Qup2 to Qwn2 corresponding to the second voltage vector V(2) are at "1", the corresponding semiconductor switches are switched ON, and when the switching signals Qup2 to Qwn2 corresponding to the second voltage vector V(2) are at "0", the corresponding semiconductor switches are switched OFF. Further, when the second voltage vector V(2) is at either V0 or V7, the second bus current Idc2 falls to 0, whereas when the second voltage vector V(2) is at a value other than V0 or V7, the second bus current Idc2 becomes equal to either one of the three phase currents (Iu2, Iv2, Iw2) flowing through the second three-phase windings or either one of sign-inverted values (−Iu2, −Iv2, −Iw2) of the three phase currents (Iu2, Iv2, Iw2).

Here, as illustrated below, the second voltage vector V(2) is a vector having the second voltage commands Vu2_ref, Vv2_ref, Vw2_ref as elements.

$$V(2)=(Vu2\_ref, Vv2\_ref, Vw2\_ref)$$

Furthermore, "the second voltage vector V(2) is at V0" corresponds to the second voltage vector V(2) when the control unit 5B outputs the second voltage commands Vu2_ref, Vv2_ref, Vw2_ref in order to set the respective voltages Vu2, Vv2, Vw2 of the second three-phase windings U2, V2, W2 to the negative electrode side potential V− of the DC power supply 2.

Similarly, "the second voltage vector V(2) is at V7" corresponds to the second voltage vector V(2) when the control unit 5B outputs the second voltage commands Vu2_ref, Vv2_ref, Vw2_ref in order to set the respective voltages Vu2, Vv2, Vw2 of the second three-phase windings U2, V2, W2 to the positive electrode side potential V+ of the DC power supply 2.

FIG. 14 shows a case in which a power short fault or a ground short fault occurs due to a short-circuit fault in the semiconductor switches Sup1 to Swn1. Items shown in FIG. 14 are respectively identical to the items shown in FIG. 12. FIG. 14 is a view illustrating a current that flows as the first bus current Idc1 when a power short fault or a ground short fault occurs due to a short-circuit fault in the semiconductor switches Sup1 to Swn1 and the first voltage vector V(1) switches to V0 or V7.

When the first voltage vector V(1) switches to V0 or V7 in a case where the semiconductor switches Sup1 to Swn1 are all normal, as shown in FIG. 12, the first bus current Idc1 falls to 0.

When, on the other hand, the first voltage vector V(1) switches to V0 in a case where a power short fault occurs due to a short-circuit fault in Sup1, for example, as shown in FIG. 14, the semiconductor switches Sun1, Svn1, Swn1 are controlled to ON, and moreover, since a short-circuit fault has occurred in Sup1, a short-circuit current Is1 flows from the positive electrode side of the DC power supply 2 to the negative electrode side of the DC power supply 2 via Sup1 and Sun1 as the first bus current Idc1. Similarly, when the first voltage vector V(1) switches to V0 in a case where a power short fault occurs due to a short-circuit fault in Svp1, the short-circuit current Is1 flows from the positive electrode side of the DC power supply 2 to the negative electrode side of the DC power supply 2 via Svp1 and Svn1 as the first bus current Idc1. Furthermore, when the first voltage vector V(1) switches to V0 in a case where a power short fault occurs due to a short-circuit fault in Swp1, the short-circuit current Is1 flows from the positive electrode side of the DC power supply 2 to the negative electrode side of the DC power supply 2 via Swp1 and Swn1 as the first bus current Idc1. In other words, when the first voltage vector V(1) switches to V0 in a case where a power short fault occurs due to a short-circuit fault in one of the upper side semiconductor switches Sup1, Svp1, Swp1 of the first voltage application unit 3, the short-circuit current Is1 flows as the first bus current Idc1. Hence, the first bus current Idc1 varies irrespective of the phase of the first windings, among the U phase, the V phase, and the W phase, in which the power short fault occurs.

Further, when the first voltage vector V(1) switches to V7 in a case where a ground short fault occurs due to a short-circuit fault in Sun1, for example, as shown in FIG. 14, the semiconductor switches Sup1, Svp1, Swp1 are controlled to ON, and moreover, since a short-circuit fault has occurred in Sun1, the short-circuit current Is1 flows from the positive electrode side of the DC power supply 2 to the negative electrode side of the DC power supply 2 via Sup1 and Sun1 as the first bus current Idc1. Similarly, when the first voltage vector V(1) switches to V7 in a case where a ground short fault occurs due to a short-circuit fault in Svn1, the short-circuit current Is1 flows from the positive electrode side of the DC power supply 2 to the negative electrode side of the DC power supply 2 via Svp1 and Svn1 as the first bus current Idc1. Furthermore, when the first voltage vector V(1) switches to V7 in a case where a ground short fault occurs due to a short-circuit fault in Swn1, the short-circuit current Is1 flows from the positive electrode side of the DC power supply 2 to the negative electrode side of the DC power supply 2 via Swp1 and Swn1 as the first bus current Idc1. In other words, when the first voltage vector V(1) switches to V7 in a case where a ground short fault occurs due to a short-circuit fault in one of the lower side semiconductor switches Sun1, Svn1, Swn1 of the first voltage application unit 3, the short-circuit current Is1 flows as the first bus current Idc1. Hence, the first bus current Idc1 varies irrespective of the phase of the first windings, among the U phase, the V phase, and the W phase, in which the ground short fault occurs.

FIG. 15 shows a case in which a power short fault or a ground short fault occurs due to a short-circuit fault in the semiconductor switches Sup2 to Swn2. Items shown in FIG. 15 are respectively identical to the items shown in FIG. 13. FIG. 15 is a view illustrating a current that flows as the second bus current Idc2 when a short-circuit fault occurs in the semiconductor switches Sup2 to Swn2 and the second voltage vector V(2) switches to V0 or V7.

Similarly to the case shown in FIG. 14, when the second voltage vector V(2) switches to V0 or V7 in a case where the semiconductor switches Sup2 to Swn2 are all normal, as shown in FIG. 13, the second bus current Idc2 falls to 0. When, on the other hand, the second voltage vector V(2) switches to V0 in a case where a power short fault occurs due to a short-circuit fault in one of the upper side semiconductor switches Sup2, Svp2, Swp2 of the second voltage application unit 4, as shown in FIG. 15, a short-circuit current Is2 flows as the second bus current Idc2. Further, when the second voltage vector V(2) switches to V7 in a case where a ground short fault occurs due to a short-circuit fault in one of the lower side semiconductor switches Sun2, Svn2, Swn2 of the second voltage application unit 4, the short-circuit current Is2 flows as the second bus current Idc2. Hence, the second bus current Idc2 varies irrespective of the phase of the second windings, among the U phase, the V phase, and the W phase, in which the power short fault or the ground short fault occurs.

In the control unit 5B according to the third embodiment, as described above, the first bus current Idc1 and the second bus current Idc2 are used as the fault detection signals, and the occurrence of a power short fault or a ground short fault is determined using the fact that the first bus current Idc1 and the second bus current Idc2 take larger values when a power short fault or a ground short fault occurs than in a normal condition.

Figure 16:
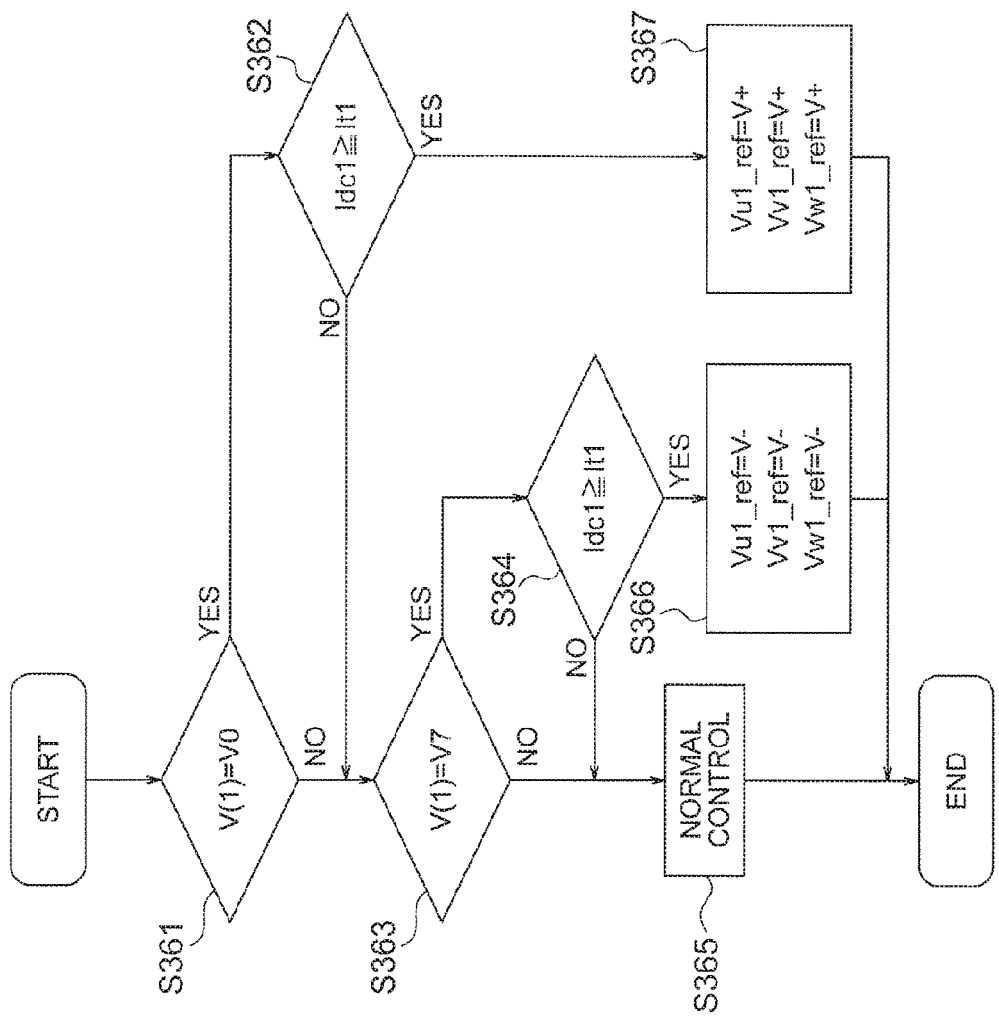
FIG. 16 is a flowchart showing an operation of a control unit provided in the control apparatus for the AC rotary machine according to the third embodiment of this invention.

FIG. 16 is a flowchart showing an operation of the control unit 5B according to the third embodiment. In step S361, a determination is made as to whether or not the first voltage vector V(1) is equal to V0. When the first voltage vector V(1) is equal to V0, "YES" is selected, whereupon step S362 is executed. When the first voltage vector V(1) is not equal to V0, on the other hand, "NO" is selected, whereupon step S363 is executed. In step S362, the first bus current Idc1 serving as the fault detection signal is compared with a preset power short determination value It1. When the first bus current Idc1 is equal to or larger than the power short determination value It1, "YES" is selected, whereupon step S367 is executed. When the first bus current Idc1 is smaller than the power short determination value It1, on the other hand, "NO" is selected, whereupon step S363 is executed. The power short determination value It1 is set at a smaller value than the short-circuit current Is1 within a range where erroneous detections do not occur in a normal condition.

In step S363, a determination is made as to whether or not the first voltage vector V(1) is equal to V7. When the first voltage vector V(1) is equal to V7, "YES" is selected, whereupon step S364 is executed. When the first voltage vector V(1) is not equal to V7, on the other hand, "NO" is selected, whereupon step S365 is executed. In step S364, the first bus current Idc1 serving as the fault detection signal is compared with the power short determination value It1. When the first bus current Idc1 is equal to or larger than the power short determination value It1, "YES" is selected, whereupon step S366 is executed. When the first bus current Idc1 is smaller than the power short determination value It1, on the other hand, "NO" is selected, whereupon step S365 is executed. In step S365, it is determined that neither a power short fault nor a ground short fault has occurred, and normal control is performed as described above in relation to step S83 of FIG. 8. In step S366, a ground short fault is determined to have occurred, and the first voltage commands Vu1_ref, Vv1_ref, Vw1_ref are set at V− (the negative electrode side potential of the DC power supply 2). In step S367, a power short fault is determined to have occurred, and the first voltage commands Vu1_ref, Vv1_ref, Vw1_ref are set at V+(the positive electrode side potential of the DC power supply 2). Note that in FIG. 16, the order of the determinations made in step S361 and step S363 may be reversed.

Figure 17:
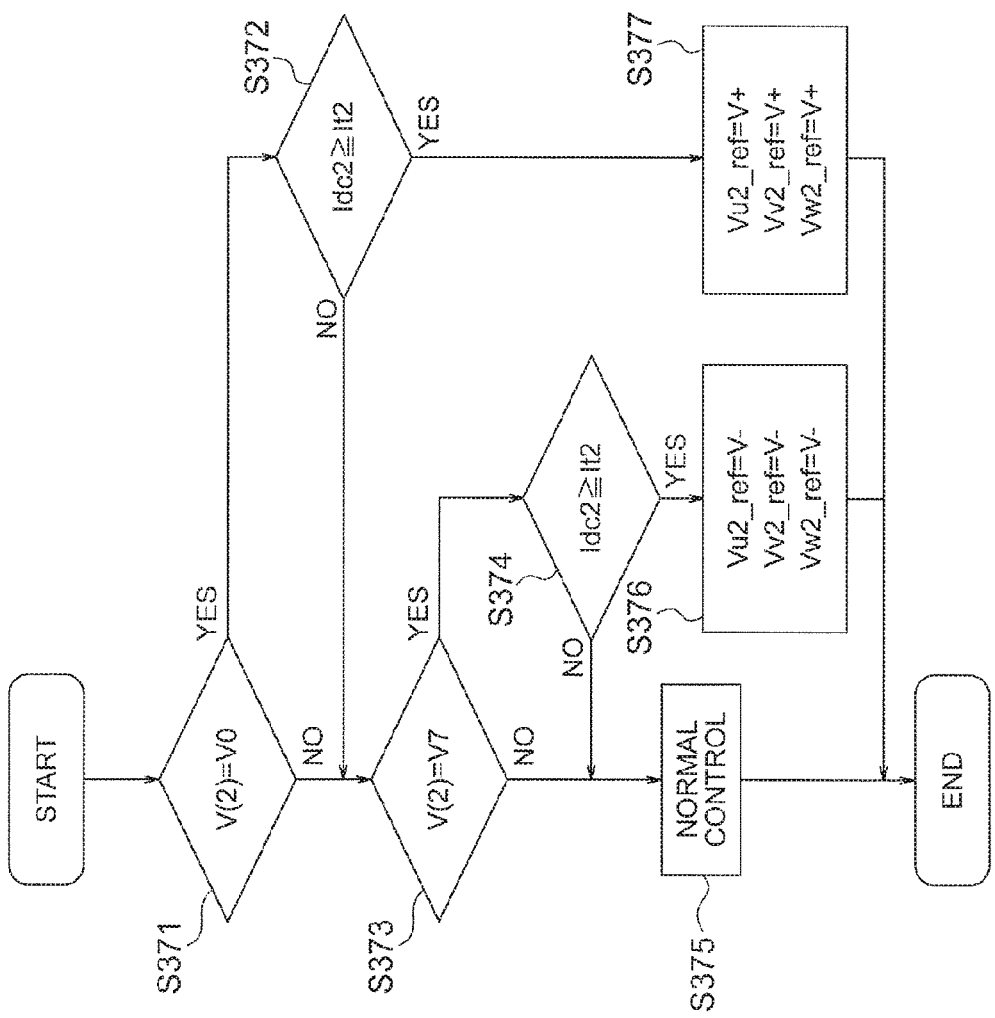
FIG. 17 is a flowchart showing an operation of the control unit provided in the control apparatus for the AC rotary machine according to the third embodiment of this invention.

FIG. 17, similarly to FIG. 16, is a view showing an operation of the control unit 5B according to the third embodiment. In step S371, a determination is made as to whether or not the second voltage vector V(2) is equal to V0. When the second voltage vector V(2) is equal to V0, "YES" is selected, whereupon step S372 is executed. When the second voltage vector V(2) is not equal to V0, on the other hand, "NO" is selected, whereupon step S373 is executed. In step S372, the second bus current Idc2 serving as the fault detection signal is compared with a preset power short determination value It2. When the second bus current Idc2 is equal to or larger than the power short determination value It2, "YES" is selected, whereupon step S377 is executed. When the second bus current Idc2 is smaller than the power short determination value It2, on the other hand, "NO" is selected, whereupon step S373 is executed. The power short determination value It2 is set at a smaller value than the short-circuit current Is2 within a range where erroneous detections do not occur in a normal condition.

In step S373, a determination is made as to whether or not the second voltage vector V(2) is equal to V7. When the second voltage vector V(2) is equal to V7, "YES" is selected, whereupon step S374 is executed. When the second voltage vector V(2) is not equal to V7, on the other hand, "NO" is selected, whereupon step S375 is executed.

In step S374, the second bus current Idc2 serving as the fault detection signal is compared with the power short determination value It2. When the second bus current Idc2 is equal to or larger than the power short determination value It2, "YES" is selected, whereupon step S376 is executed. When the second bus current Idc2 is smaller than the power short determination value It2, on the other hand, "NO" is selected, whereupon step S375 is executed. In step S375, it is determined that neither a power short fault nor a ground short fault has occurred, and normal control is performed as described above in relation to step S83 of FIG. 8. In step S376, a ground short fault is determined to have occurred, and the second voltage commands Vu2_ref, Vv2_ref, Vw2_ref are set at V− (the negative electrode side potential of the DC power supply 2). In step S377, a power short fault is determined to have occurred, and the second voltage commands Vu2_ref, Vv2_ref, Vw2_ref are set at V+(the positive electrode side potential of the DC power supply 2). Note that in FIG. 17, the order of the determinations made in step S371 and step S373 may be reversed.

In the third embodiment, as described above, a power short fault and a ground short fault can be detected by employing the current Idc1 flowing through the DC bus of the first voltage application unit 3 and the current Idc2 flowing through the DC bus of the second voltage application unit 4 as the fault detection signals.

Furthermore, in the third embodiment, the currents Idc1, Idc2 serving as the fault detection signals can also be used in current feedback control. More specifically, in the first and second embodiments, separate detection units for detecting the currents Iu1, Iv1, Iw1 flowing through the first three-phase windings and the currents Iu2, Iv2, Iw2 flowing through the second three-phase windings must be added respectively to the configurations shown in FIGS. 1 and 2 in order to implement current feedback control, whereas in the third embodiment, the currents Iu1, Iv1, Iw1 flowing through the first three-phase windings can be detected on the basis of the first bus current Idc1 in accordance with the table shown in FIG. 12, and the first voltage commands Vu1_ref, Vv1_ref, Vw1_ref can be calculated on the basis of these current values and the control command. Similarly, the currents Iu2, Iv2, Iw2 flowing through the second three-phase windings can be detected on the basis of the second bus current Idc2 in accordance with the table shown in FIG. 13, and the second voltage commands Vu2_ref, Vv2_ref, Vw2_ref can be calculated on the basis of these current values and the control command.

Moreover, in the third embodiment, similarly to the first and second embodiments, a complicated configuration is not required to detect the terminal voltages of the respective phases when detecting a power short or a ground short, and fault detection can be realized in relation to one set of three-phase windings with a simple configuration using a single detection signal (the first bus current Idc1 with respect to the first three-phase windings and the second bus current Idc2 with respect to the second three-phase windings).

In the third embodiment described above, similarly to the first embodiment, by providing the fault detection units 6B, 7B for outputting, to the control unit 5B, fault detection signals that vary irrespective of the phase of the three-phase windings in which the ground short fault or the power short fault occurs, the control unit 5B can output a voltage command to the voltage application unit 3 or 4 related to the faulty set on the basis of the fault detection signals to set the respective voltages at the negative electrode side potential V− of the DC power supply 2 when a ground short fault is detected and to set the respective voltages at the positive electrode side potential V+ of the DC power supply 2 when a power short fault is detected, and as a result, control of the AC rotary machine 1 can be continued using the voltage application unit 3 or 4 related to the normal set rather than the faulty set.

Furthermore, in the third embodiment, the fault detection units 6B, 7B respectively include bus current detectors that detect the bus currents Idc1, Idc2 passing between the DC power supply 2 and the voltage application units 3 and 4 in the respective sets of windings. When the control unit 5B outputs a voltage command to the voltage application unit 3 or 4 related to one of the sets of windings in order to set the respective voltages applied to the three-phase windings at identical potentials, the fault detection unit 6B or 7B detects the bus current of the corresponding set of windings using the bus current detector, and generates the fault detection signal on the basis of the detected bus current. As a result, a power short fault and a ground short fault can be detected, and in addition, the fault detection signals can be used in current feedback control.

Moreover, in the third embodiment, when the control unit 5B outputs the voltage command V7 to the voltage application unit 3 or 4 related to one of the sets of windings in order to set the respective voltages applied to the three-phase windings at the positive electrode side potential of the DC power supply 2, the fault detection unit 6B,7B detects the bus current of the corresponding set and generates a fault detection signal indicating that a ground short fault has occurred on the basis of the detected bus current. As a result, a ground short fault can be detected reliably with a simple configuration.

Furthermore, in the third embodiment, when the control unit 5B outputs the voltage command V0 to the voltage application unit 3 or 4 related to one of the sets of windings in order to set the respective voltages applied to the three-phase windings at the negative electrode side potential of the DC power supply 2, the fault detection unit 6B,7B detects the bus current of the corresponding set and generates a fault detection signal indicating that a power short fault has occurred on the basis of the detected bus current. As a result, a power short fault can be detected reliably with a simple configuration. As a result, a power short fault can be detected reliably with a simple configuration.

Figure 18A:
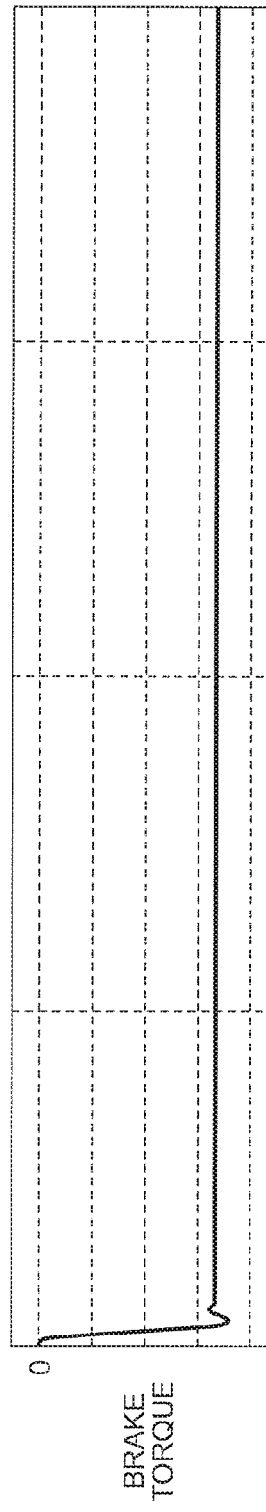
FIG. 18A is an illustrative view showing a relationship between a current supplied to a voltage application unit related to a faulty set and a brake torque, with FIG. 18B, according to the first to third embodiments of this invention.
Figure 18B:
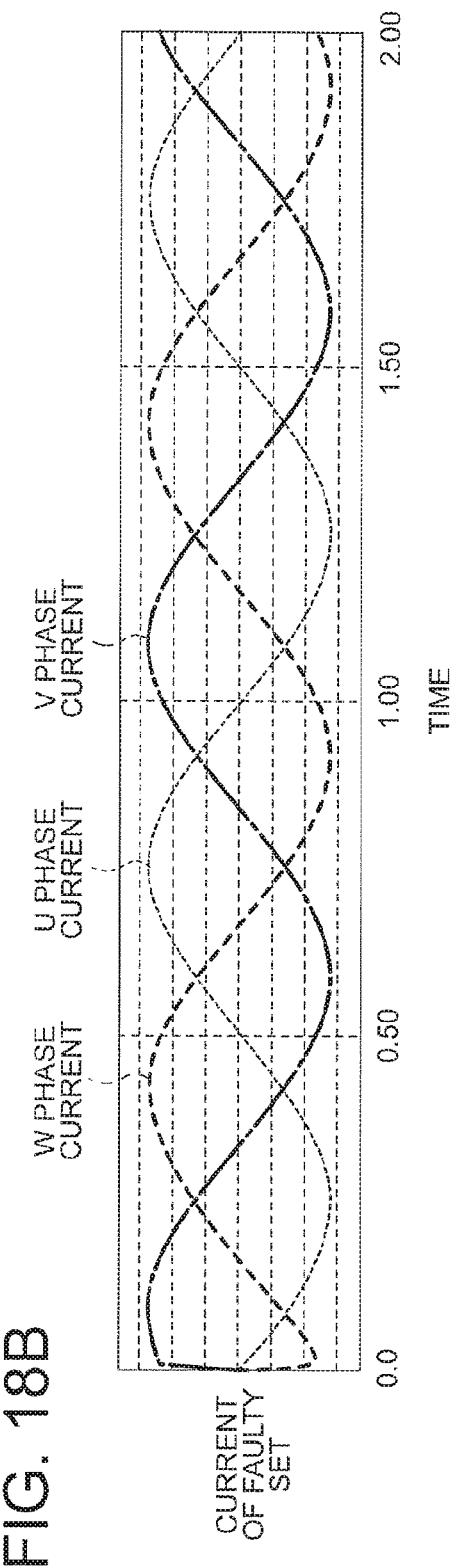
FIG. 18B is an illustrative view showing a relationship between a current supplied to a voltage application unit related to a faulty set and a brake torque, with FIG. 18A, according to the first to third embodiments of this invention.
Figure 19:
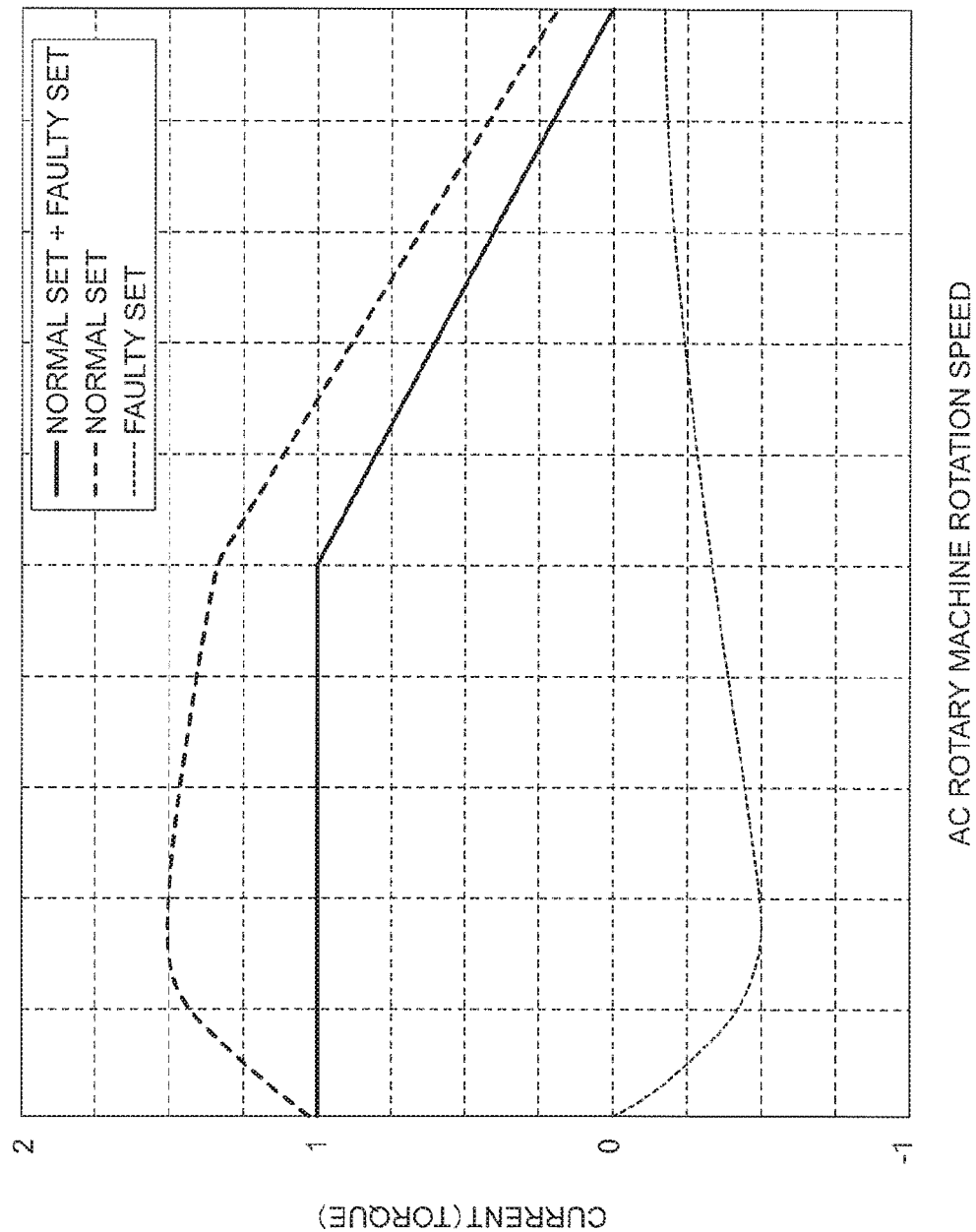
FIG. 19 is an illustrative view showing a current characteristic of the voltage application unit relative to a rotation speed of the AC rotary machine, according to the first to third embodiments of this invention.

In the first to third embodiments, described above, when a voltage command is output in relation to a set of windings in which a power short fault or a ground short fault has occurred, among the first three-phase windings and the second three-phase windings, in order to set the respective voltages thereof at the negative electrode side potential V− or the positive electrode side potential V+ of the DC power supply 2, currents shown in FIG. 18B flow through the faulty set in accordance with an induced voltage of the AC rotary machine 1, and in accordance with these currents, brake torque shown in FIG. 18A is generated. The brake torque is dependent on a rotation speed of the AC rotary machine 1, and in a current (torque)—AC rotary machine rotation speed characteristic shown in FIG. 19, torque (brake torque) indicated by a dot-dash line in FIG. 19 is generated in the "faulty set". Assuming in FIG. 19 that a desired current (torque) to be output from the AC rotary machine 1 is "normal set+faulty set", as indicated by a solid line, the current (torque) of the normal set must be corrected to a current (torque) indicated by a dotted line in FIG. 19 in order to reduce the effect of the brake torque in the faulty set. The current (torque) supplied to the voltage application unit is dependent on the rotation speed of the AC rotary machine 1. Therefore, a rotation speed detection unit such as an encoder, a resolver, or a Hall sensor, for example, is provided to detect the rotation speed of the AC rotary machine 1, and the detected rotation speed is input into the control unit 5, 5A, 5B. As a result, the control unit 5, 5A, 5B can correct the voltage command output to the voltage application unit related to the normal set in accordance with the detected rotation speed, thereby correcting the current that is supplied to the voltage application unit related to the normal set so as to reduce the effect of the brake torque in the faulty set, and can output the current (torque) of the normal set, as shown in FIG. 19.

Further, in the first to third embodiments, the occurrence of a power short fault or a ground short fault is determined, whereupon the voltage command relating to the faulty set is set at the positive electrode side potential of the DC power supply when a power short fault occurs and at the negative electrode side potential of the DC power supply when a ground short fault occurs. Instead, however, circuit breakers may be provided respectively between the voltage application units and the three-phase windings so as to be electrically connected thereto, and when a power short fault or a ground short fault is detected, the circuit breaker of the faulty set may be opened.

Furthermore, the first to third embodiments are configured to include the AC rotary machine 1 having two sets of three-phase windings and the two voltage application units 3, 4, but it goes without saying that on the basis of the first to third embodiments, this invention may also be applied to a configuration that includes an AC rotary machine having N (where N is a natural number no smaller than 2) sets of three-phase windings and N (where N is a natural number no smaller than 2) voltage application units.

The invention claimed is:

1. A control apparatus for an AC rotary machine, which controls an AC rotary machine having N sets of three-phase windings, where N is a natural number no smaller than two, the control apparatus comprising:
    N voltage application units that power-convert a direct current voltage from a DC power supply and apply voltages respectively to the N sets of three-phase windings;
    a control unit that outputs a voltage command to the N voltage application units; and
    a fault detection unit that outputs a fault detection signal to the control unit for each set of three-phase windings when a ground short fault or a power short fault occurs in at least one of the N sets of three-phase windings,
    wherein a value of the fault detection signal output by the fault detection unit when the ground short fault occurs differs from a value thereof when the power short fault occurs,
    when the ground short fault is determined to have occurred on the basis of the fault detection signal, the control unit outputs a voltage command to the voltage application unit related to the set of three-phase windings in which the fault has occurred in order to set the voltages applied respectively to the three-phase windings of the set in which the fault has occurred at a negative electrode side potential of the DC power supply, and
    when the power short fault is determined to have occurred on the basis of the fault detection signal, the control unit outputs a voltage command to the voltage application unit related to the set of three-phase windings in which the fault has occurred in order to set the voltages applied respectively to the three-phase windings of the set in which the fault has occurred at a positive electrode side potential of the DC power supply.

2. The control apparatus for an AC rotary machine according to claim 1, wherein the fault detection unit generates the fault detection signal by adding together terminal voltages of the three-phase windings.

3. The control apparatus for an AC rotary machine according to claim 1, wherein the control unit compares the value of the fault detection signal with a preset ground short determination threshold, and determines that the ground short fault has occurred when the value of the fault detection signal is equal to or smaller than the ground short determination threshold.

4. The control apparatus for an AC rotary machine according to claim 1, wherein the control unit compares the value of the fault detection signal with a preset power short determination threshold, and determines that the power short fault has occurred when the value of the fault detection signal is equal to or larger than the power short determination threshold.

5. The control apparatus for an AC rotary machine according to claim 1, wherein the fault detection unit includes a bus current detector that detects a bus current flowing between the DC power supply and the voltage application unit for each of the sets, and
    when the control unit outputs the voltage command to the voltage application unit related to one of the sets in order to set the voltages applied respectively to the three-phase windings thereof at identical potentials, the fault detection unit detects the bus current of the corresponding set using the bus current detector, and generates the fault detection signal on the basis of the detected bus current.

6. The control apparatus for an AC rotary machine according to claim 5, wherein when the control unit outputs the voltage command to the voltage application unit related to one of the sets in order to set the voltages applied respectively to the three-phase windings thereof at the positive electrode side potential of the DC power supply, the fault detection unit detects the bus current of the corresponding set, and generates a fault detection signal indicating that the ground short fault has occurred on the basis of the detected bus current.

7. The control apparatus for an AC rotary machine according to claim 5, wherein when the control unit outputs the voltage command to the voltage application unit related to one of the sets in order to set the voltages applied respectively to the three-phase windings thereof at the negative electrode side potential of the DC power supply, the fault detection unit detects the bus current of the corresponding set, and generates a fault detection signal indicating that the power short fault has occurred on the basis of the detected bus current.

8. The control apparatus for an AC rotary machine according to claim 1, wherein when the control unit detects the ground short fault or the power short fault on the basis of the fault detection signal, the control unit corrects the voltage command output to the voltage application unit not related to the set in which the fault has occurred so as to reduce an effect of brake torque generated in the AC rotary machine in accordance with a current supplied to the voltage application unit related to the set in which the fault has occurred, and outputs the corrected voltage command.

9. The control apparatus for an AC rotary machine according to claim 8, further comprising a rotation speed detection unit that detects a rotation speed of the AC rotary machine,
   wherein the control unit performs the correction on the basis of the rotation speed.

\* \* \* \* \*